(12) United States Patent
Sadler et al.

(10) Patent No.: US 9,201,251 B2
(45) Date of Patent: Dec. 1, 2015

(54) EYEWEAR ASSEMBLY WITH SIDE SHIELDS ATTACHABLE TO INNER SURFACES OF TEMPLES

(71) Applicant: The Hilsinger Company, Plainville, MA (US)

(72) Inventors: Thomas M. Sadler, Warren, RI (US); Michael D. Lennox, N. Attleboro, MA (US)

(73) Assignee: The Hilsinger Company, Plainville, MA (US)

( * ) Notice: Subject to any disclaimer, the term of this patent is extended or adjusted under 35 U.S.C. 154(b) by 0 days.

(21) Appl. No.: 14/209,173

(22) Filed: Mar. 13, 2014

(65) Prior Publication Data

US 2014/0340629 A1 Nov. 20, 2014

Related U.S. Application Data

(60) Provisional application No. 61/824,153, filed on May 16, 2013.

(51) Int. Cl.
*G02C 7/10* (2006.01)
*G02C 11/00* (2006.01)
*G02C 5/14* (2006.01)

(52) U.S. Cl.
CPC ............... *G02C 11/12* (2013.01); *G02C 5/146* (2013.01); *G02C 2200/06* (2013.01)

(58) Field of Classification Search
CPC .......... G02C 5/146; G02C 7/16; G02C 11/12; G02C 2200/06
USPC ...................................... 351/44, 47, 121, 140
See application file for complete search history.

(56) References Cited

U.S. PATENT DOCUMENTS

| | | | |
|---|---|---|---|
| 1,706,682 | A | 5/1928 | Takacs |
| 2,253,101 | A | 8/1941 | Thoreson |
| 2,932,066 | A | 4/1960 | Lindblom |
| 3,436,761 | A | 4/1969 | Liautaud et al. |
| D264,094 | S | 4/1982 | Morris |
| 5,388,269 | A | 2/1995 | Griffin |
| 5,394,567 | A | 3/1995 | Vatterott |
| D391,594 | S | 3/1998 | Hub |
| 5,877,837 | A | 3/1999 | Hayes |
| 6,074,060 | A | 6/2000 | Bruce |
| 8,376,545 | B2 | 2/2013 | Ye |
| 8,444,266 | B2 | 5/2013 | Waters |
| 2013/0063696 | A1* | 3/2013 | LaGace .......... 351/118 |

OTHER PUBLICATIONS

"Willson Side Shield Goggles," www.gilai.com, http://www.gilai.com/product_1254/Willson-Side_Shield_Goggles (Accessed Jun. 11, 2013).
"60s Mens Glasses 1960s Safety Eyeglasses Black Horn Rim Large Unisex 48/24 Green Translucent Side Shield Titmus Optical," www.etsy.com, http://www.etsy.com/listing/113574834/60s-mens-glasses-1960s-safety-eyeglasses (Accessed Jun. 11, 2013).

* cited by examiner

*Primary Examiner* — Huy K Mai
(74) *Attorney, Agent, or Firm* — Barlow, Josephs & Holmes, Ltd.

(57) ABSTRACT

The assembly for attaching a side shield to an eyewear temple includes a temple having an outer side and an inner side. A locking member is connected to the inner side of the temple. A side shield, having a complementary locking member to the locking member on the inner side of the temple is removably connected thereto. The side shield is attached to the inner side of the temple to avoid obstruction or distortion of the outer ornamental side of the eyewear temple by the side shield while still providing superior eyewear protection.

14 Claims, 25 Drawing Sheets

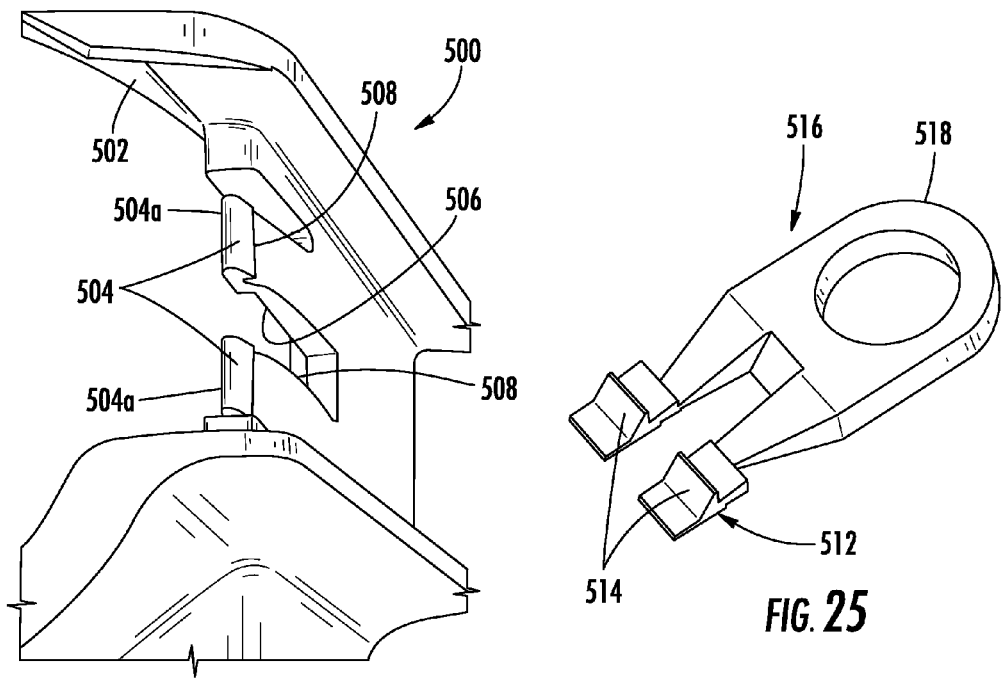
FIG. 24
FIG. 25
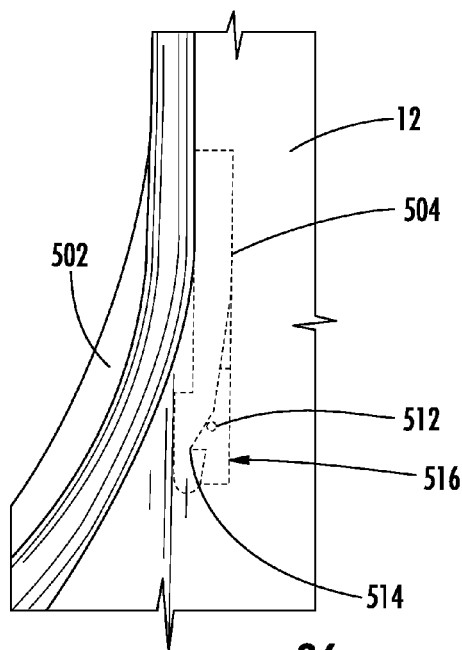
FIG. 26

EYEWEAR ASSEMBLY WITH SIDE SHIELDS ATTACHABLE TO INNER SURFACES OF TEMPLES

CROSS-REFERENCE TO RELATED APPLICATIONS

This patent document claims priority to earlier filed U.S. Provisional Patent Application Ser. No. 61/824,153, filed on May 16, 2013, the entire contents of which are incorporated herein by reference.

BACKGROUND OF THE INVENTION

The present invention relates to eyewear and, more particularly, to eyewear that is worn by a user for safety purposes.

Various environments are very dangerous due to the exposure of flying debris and other materials. For example, a tooling shop is constantly exposed to flying metallic debris, which presents a particularly dangerous condition for the eyes of the people present in the environment. Such flying metallic debris, caused from drilling and cutting of metal tooling, can easily fly into the eyes of a person in the environment causing serious injury.

To avoid contact with such debris, safety eyewear is typically employed. Such safety eyewear is available in many different forms. The safety eyewear used usually varies according to the level of protection needed. For example, face shields are often employed to completely protect the face of the user when there is a large volume of debris. Also, goggles may be used to protect the eyes only of the user when the volume and nature of the debris is significant.

In many instances, conventional eyeglass frames and impact-resistance lenses are more than adequate to protect the users eyes from light debris found in most work environments. However, such conventional eyeglass frames and lenses do not typically provide adequate protection on the sides of the frames in the regions of the temples. Thus, these safety glasses, using an eyeglass frame and lenses, are vulnerable to debris from the side. Therefore, there is a need to provide side shield protection for the eyewear.

To address the vulnerability of the aforesaid eyeglass frames and lenses to impact of debris from the side, shields are typically affixed to sides of the frames, such as to the temples of the eyewear, to provide additional protection from debris entering from the side of the eyewear. Such shields are typically referred to as "side shields" and can be affixed to the temples of the eyewear by various methods. Unlike goggles and full face shields, the eyeglass frame configuration of safety glasses can be made to appear similar to normal eyeglasses thus improving the aesthetic appearance of them which would make the user more likely to wear them thus improving overall safety. Most importantly, the side shields must be retained in place at all times to ensure that side protection is available at all times.

In the workplace, there is an increasing issue in that safety eyewear is becoming more fashion oriented and stylish. Part of this trend involves the inclusion temples and endpieces stylized with patterns, colors, stones, engravings, and the like on women's (and occasionally men's) frames. Therefore, there is a desire to avoid covering the ornamental temples and endpieces found in such fashion eyewear. However, despite the desire to provide more fashion oriented safety eyewear in the workplace, there is still a need to fully protect the person eyes, namely by the use of the aforementioned side shields.

Also, outside the workplace, there is often a need for side shields. For example, sunwear, such as sunglasses, can employ side shields to provide additional sun protection of the eyes. Therefore, side shields can be clear, tinted, protective, non-protective or otherwise. Therefore, there is a need for side shields in any type of eyewear.

All known prior art side shields wrap around the outside of the temples and endpieces, covering and distorting any design elements. Therefore, there is a need to keep the outer exposed surfaces of the stylish temples free of obstruction while still providing the needed side shield protection.

In view of the foregoing, the side shields must be easy to attach and secure in place while not blocking the ornamental stylish eyewear temples. Unlike permanent side shields, there is a need for the side shields to be removable so they can be used as normal eyewear outside of the workplace. Therefore, there is a need for side shields that are both attachable to the temples without obstructing or distorting their exposed surfaces while also being easily removable.

There are no known side shields that do not block the exposed ornamental surfaces of the temples of the eyewear. There have been attempts in the prior art to employ various clips and the like to retain them in place. However, all of these known prior art side shields are attached to the outer surface of the temple For example, various prior art assemblies employ a wedge member to push against the temple into frictional communication with the channel of a side shield into which the temple resides. Or, prior art side shields use a locking post through a loop attached on the temple to make it less likely to detach from the temple during use. However, these side shield assemblies still require that the side shield itself be attached and positioned over the outer exposed surfaces of the eyewear temples. While these prior art side shields adequately prevent debris from hitting the eye from the side and can be removably affixed to the temple, they all require that the side shield cover the outer ornamental surfaces of the temples. As described above, this detracts from the overall style and fashion of the eyewear because the fanciful and ornamental features are covered up.

In view of the foregoing, there is a need for a side shield assembly that can be easily and quickly installed securely without the need for complicated clips and other structures. There is also a demand for a side shield assembly that does not detach or become loose from normal use. There is a further demand for a side shield assembly that does not obstruct the outer ornamental style features of the eyewear. There is particularly a demand for a side shield eyewear assembly that is aesthetically pleasing in appearance when installed. Still further, there is a demand for a side shield eyewear assembly that is removable.

SUMMARY OF THE INVENTION

The present invention preserves the advantages of prior art eyewear side shield assemblies and methods of installing the same. In addition, the improved eyewear side shield assembly of the present invention and method of installation provides new advantages not found in currently known assemblies and methods and overcomes many disadvantages of such currently available assemblies and methods.

The invention is generally directed to the novel and unique eyewear side shield assembly and method of attaching such a side shield assembly to an eyewear temple. The side shield assembly of the present invention includes a temple having an outer side and an inner side. A first lock member is connected to the inner side of the temple. A side shield is attachable to the inner surface of the temple. The side shield includes a second lock member that is complementary to the first lock member that is present on the inner side of the temple. The shield member removably connects to the inner surface of the temple by interconnection of the first lock member on the temple with the second lock member on the side shield. When the side shield is installed, it is attached to the inner surface of the temple thereby leaving the outer exposed surfaces of temple free of a side shield so obstruction or distortion of the outer surface of the temple is avoided.

Accordingly, it is a primary object of the instant invention to provide an improved side shield assembly for eyewear.

Another object of the instant invention is to provide an improved eyewear side shield assembly that can be quickly and easily installed without the need for special tools.

Still further, an object of the instant invention is to provide an improved eyewear side shield assembly that attaches to the inner surface of the temple to avoid obstruction or distorting the style fashion features of the eyewear, such as the temples and endpieces.

Another object of the present invention is to provide an improved eyewear side shield assembly that can be easily detached from the temple of eyewear but be held in place securely enough to not fall off or dislodge under normal conditions of use.

A further object of the present invention is to provide an improved eyewear side shield assembly that is aesthetically pleasing in appearance when the side shield is installed.

Another object of the invention is to provide eyewear with a side shield assembly that meets ANSI and CSA safety Rx eyewear coverage and impact standards.

Another object of the present invention is to provide eyewear with a side shield assembly that is tinted to provide additional sun protection for sunwear.

A further object of the invention is to provide an improved eyewear side shield assembly that can be rendered "permanent" through the use of a pin or wedge or other locking structure.

Another object is to provide an improved eyewear side shield assembly that does not interfere with the normal operation, use and folding, of the temples.

Yet another object of the present invention is to provide full function of the eyewear, such as allowing spring hinges to work properly and fully.

BRIEF DESCRIPTION OF THE DRAWINGS

The novel features which are characteristic of the present invention are set forth in the appended claims. However, the invention's preferred embodiments, together with further objects and attendant advantages, will be best understood by reference to the following detailed description taken in connection with the accompanying drawings in which:

FIG. 24 is a front perspective view of an alternative embodiment of the side shield of the present invention to enable a more permanent attachment to eyewear;

FIG. 25 is a perspective view of a wedge insert for use with the shield of FIG. 24;

FIG. 26 is a top view of the side shield of FIG. 24 with a shield key located in place to permanently secure the side shield the eyewear.

DETAILED DESCRIPTION OF THE PREFERRED EMBODIMENT

Figure 1:
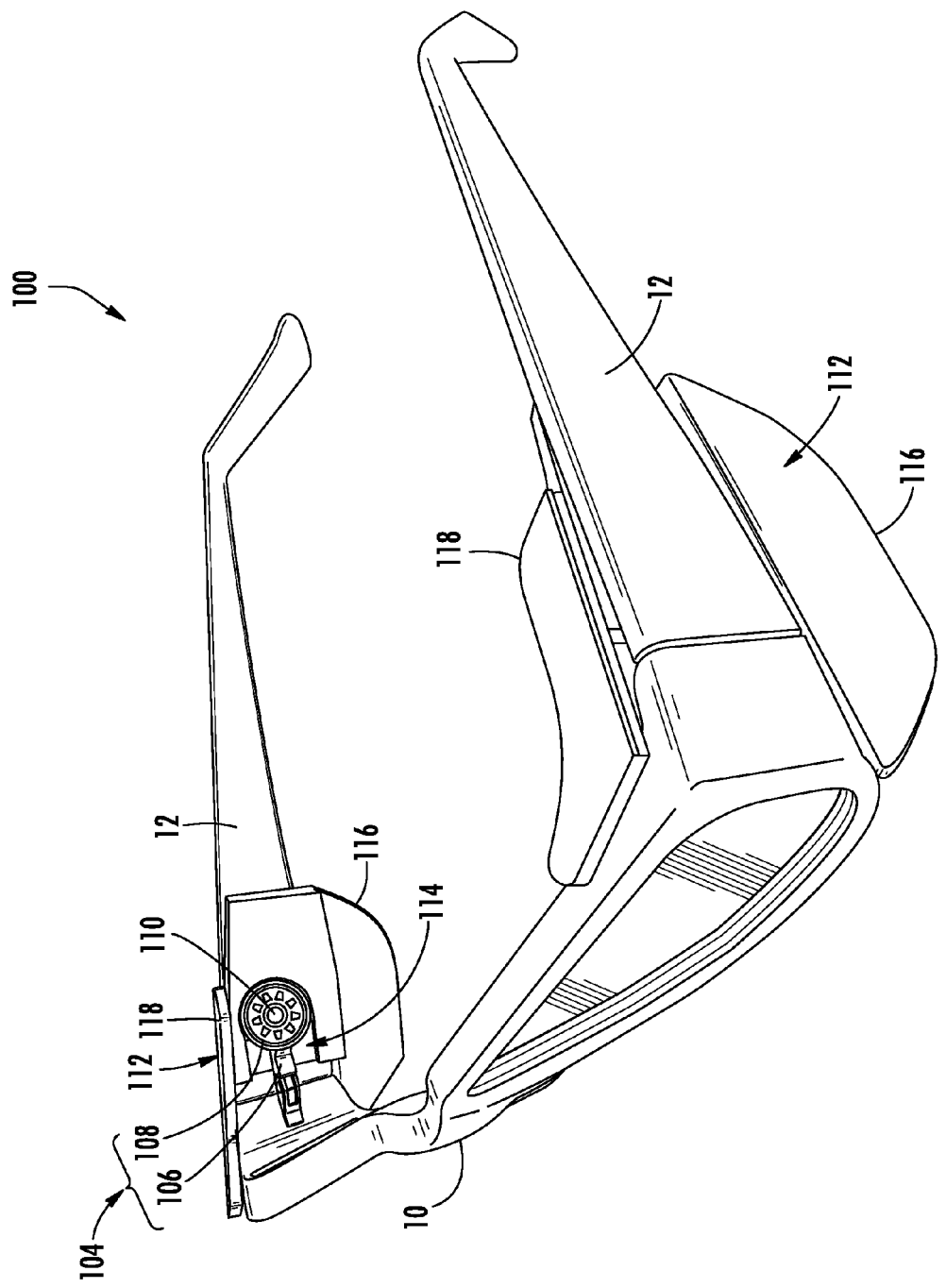
FIG. 1 shows a top perspective view with a preferred embodiment of the present invention installed onto an eyewear temple.
Figure 2:
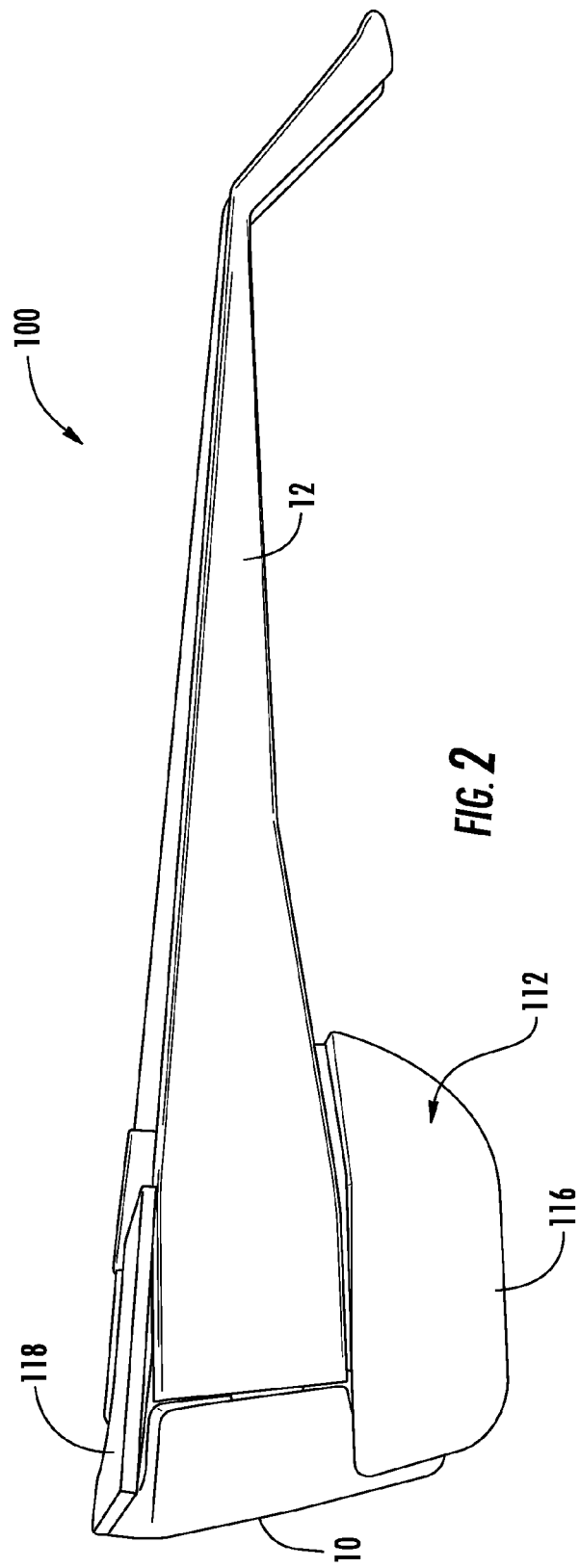
FIG. 2 shows a left side elevation view with a preferred embodiment of the present invention installed onto an eyewear temple.

The present invention relates to eyewear 10 that includes a pair of temples 12 and a respective pair of side shields for attachment thereto. For ease of discussion and illustration, the description herein will relate to the attachment of a single side shield 112 to a single temple 12. It should be understood that the other temple 12 that is not shown in all of the figures need not be discussed herein as it is structurally the same but only a mirror image thereof.

Referring now to the attached drawing figures, the invention includes essentially two elements (side shield 112 mounted on the temple 12) for an embodiment that is removable as well as an optional third element if it is desired to make the side shield permanent.

Referring first to FIGS. 1-8, a preferred embodiment of the present invention is shown at 100. A first locking member 102 is attached to the inner side (i.e. surface) of the temple 12. For example, this first locking member 102 can include a hold down assembly, consisting of a base plate 106 and top plate 108, that is attached to, or integral to the temple 12. The first locking member 102 may or may not have the additional feature, such as a threaded hole 110, and the like, for permanently attaching the side shield 112 to the temple using, for example, a rivet.

Figure 6:
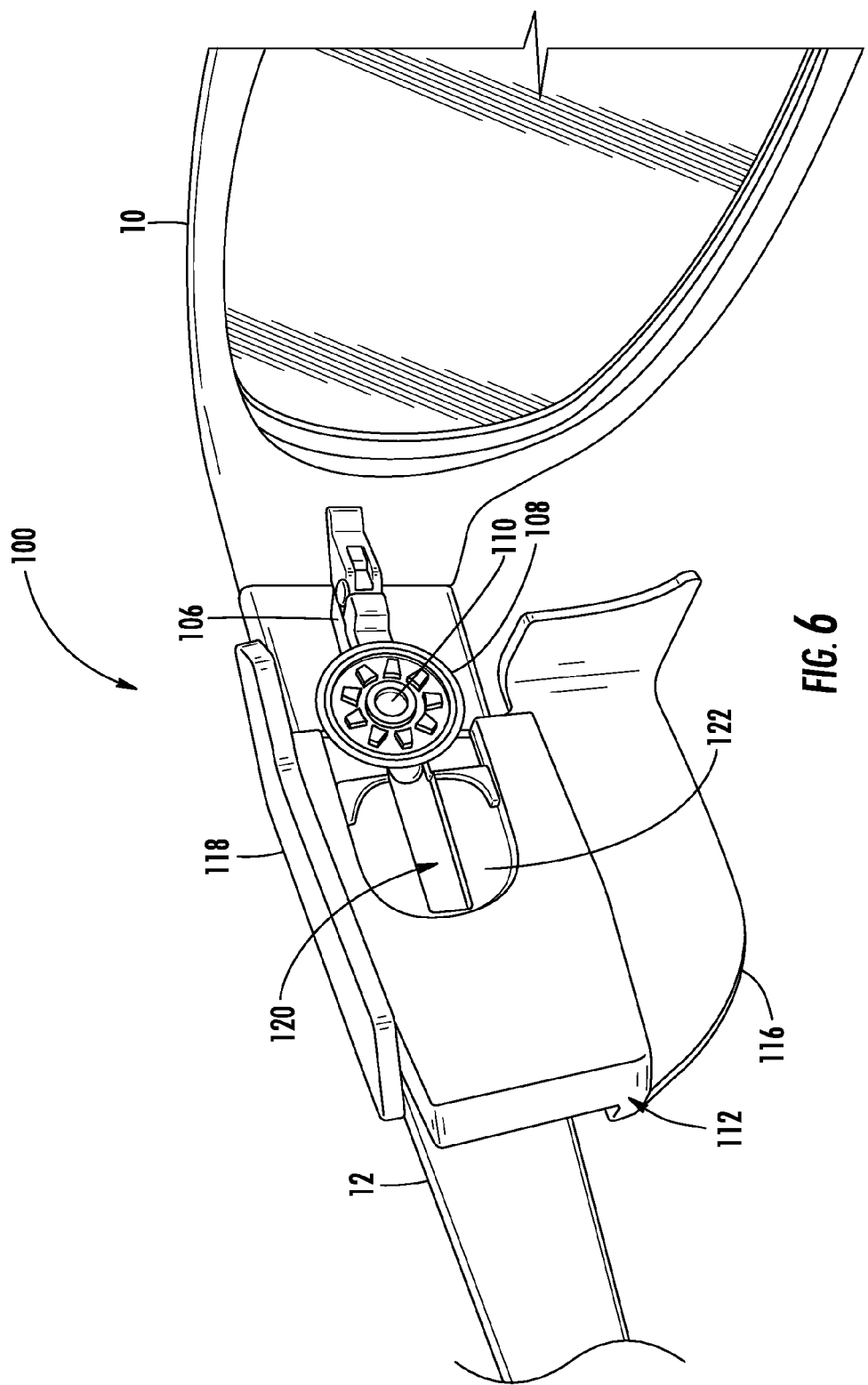
FIG. 6 shows a partial view on an inner surface of an eyewear with a preferred embodiment of the present invention being installed onto the eyewear temple.
Figure 7:
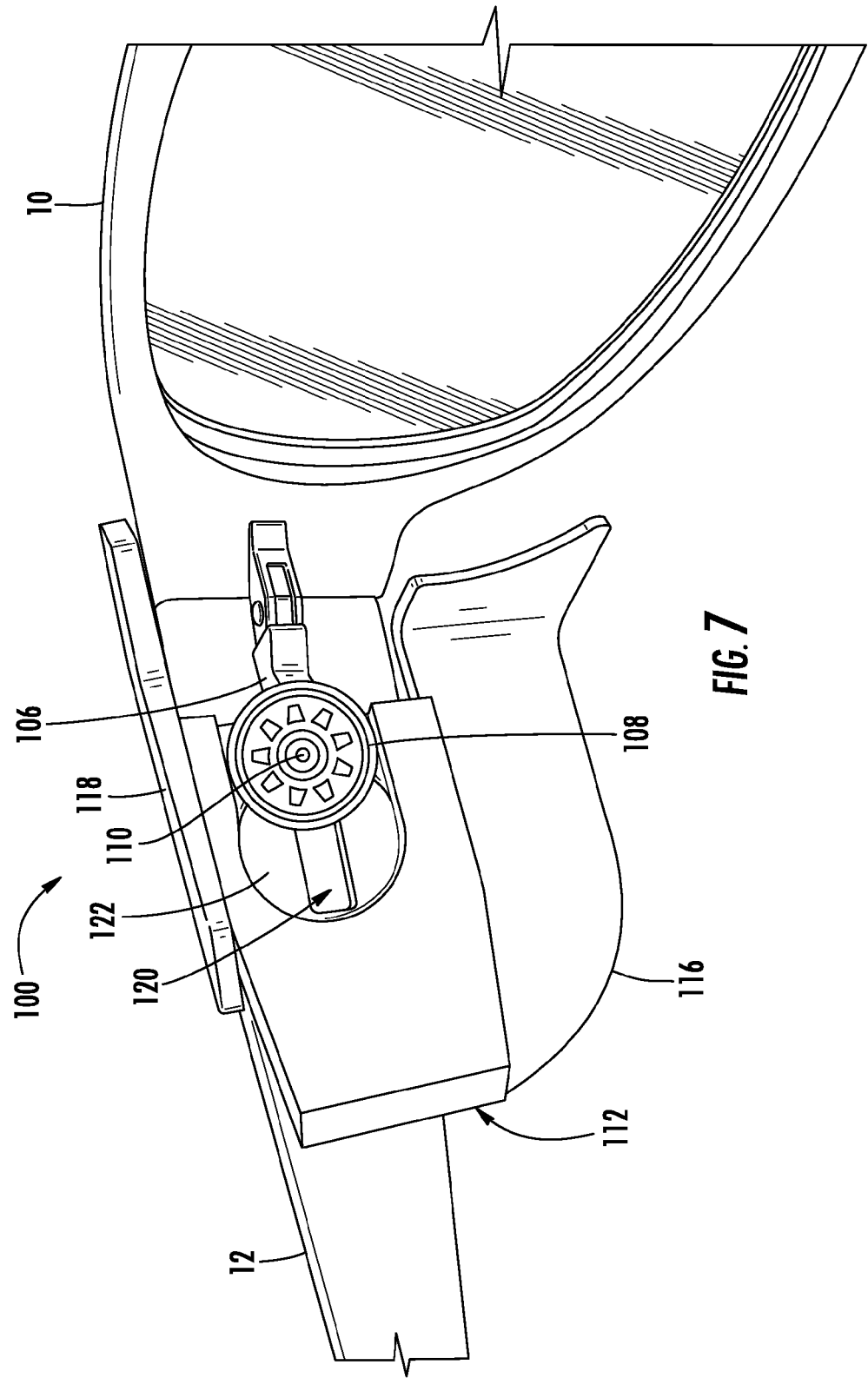
FIG. 7 shows a partial view on an inner surface of an eyewear with a preferred embodiment of the present invention being installed onto the eyewear temple, where the base plate has ridden over flanges and into a locking seat.
Figure 8:
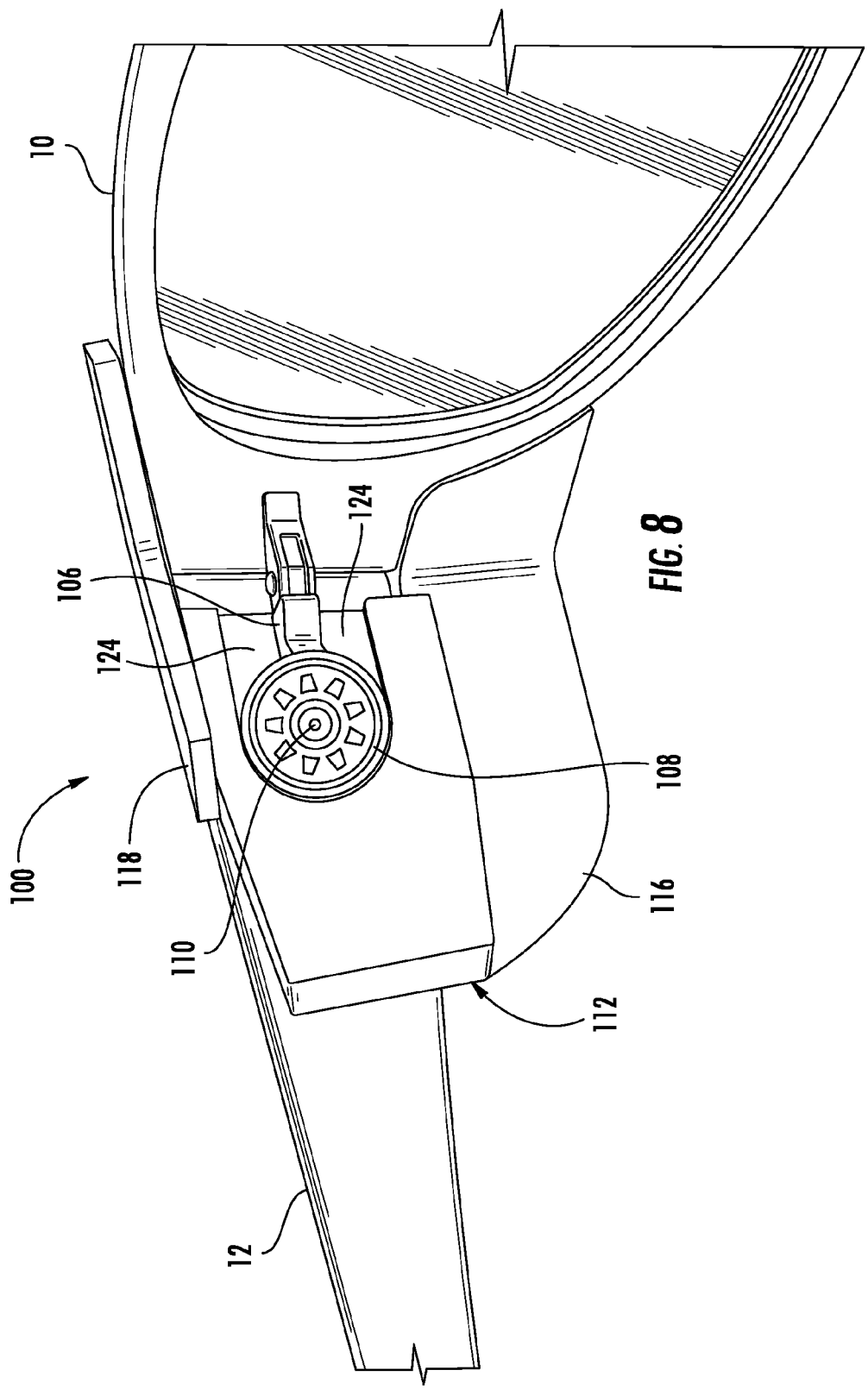
FIG. 8 shows a partial view on an inner surface of an eyewear with a preferred embodiment of the present invention installed onto the eyewear temple.
Figure 9:
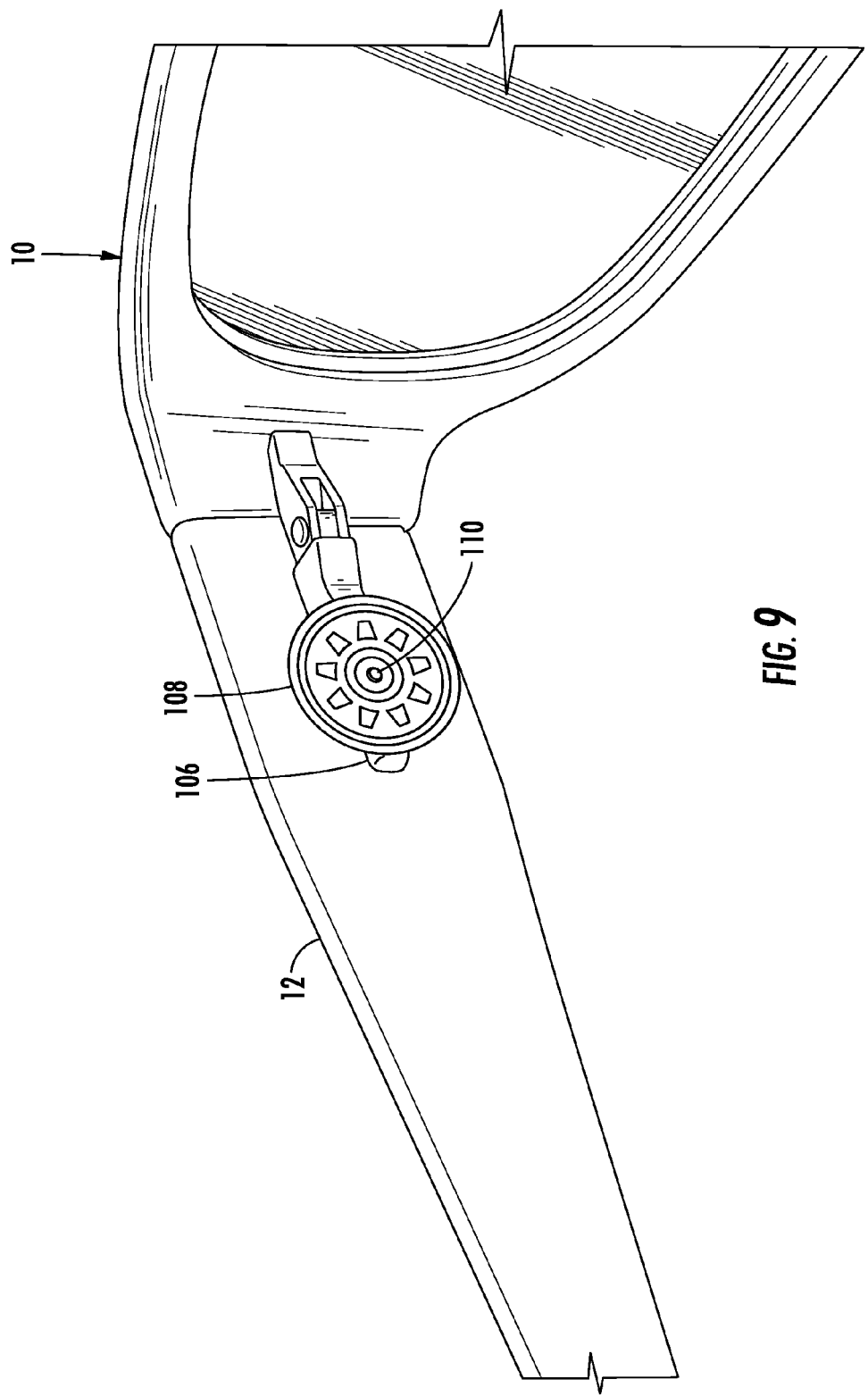
FIG. 9 shows a partial view on an inner surface of an eyewear with the side shield removed, exposing a base plate and a top plate of the present invention.
Figure 10:
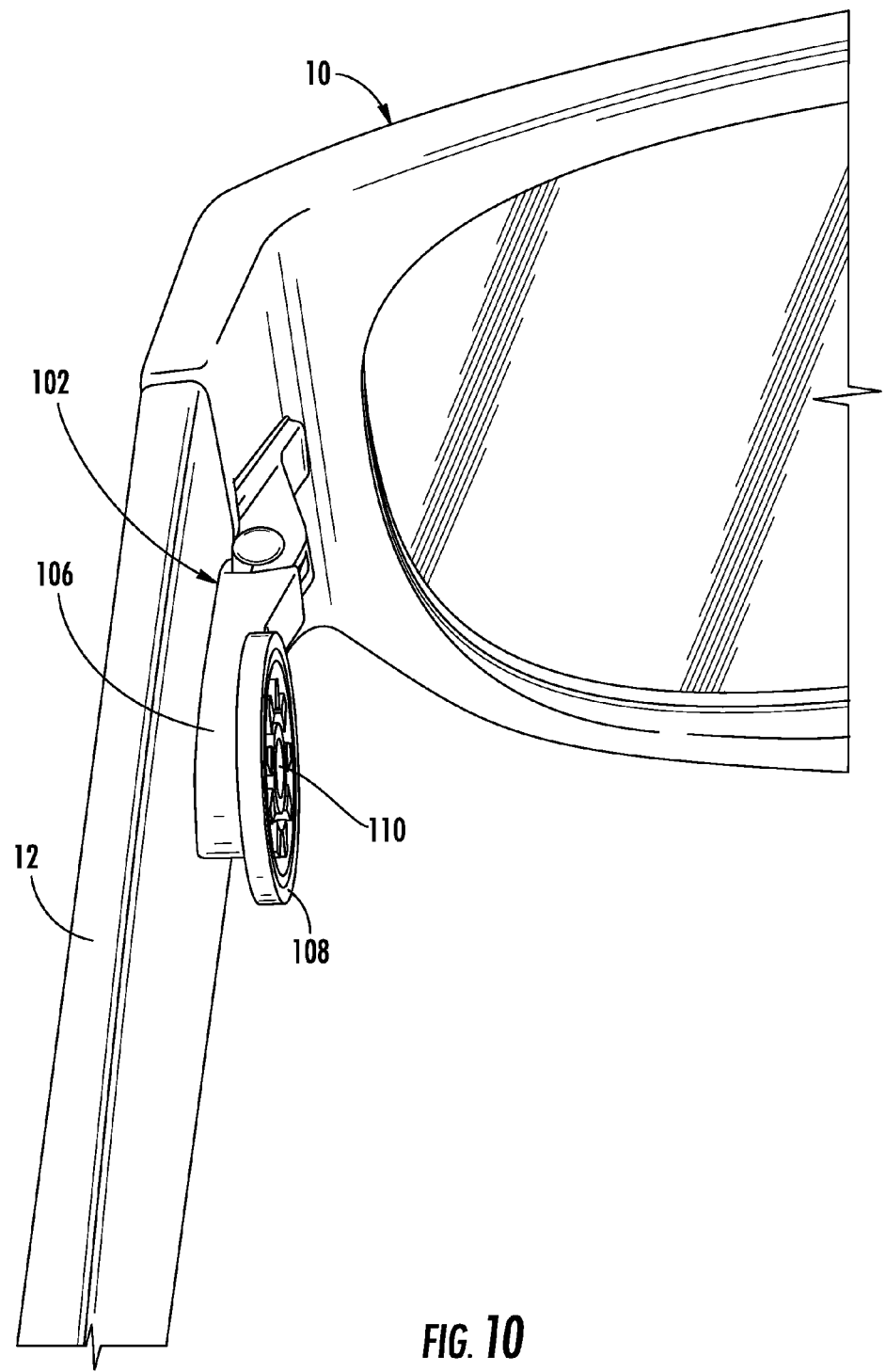
FIG. 10 shows a partial top perspective view of an eyewear with the side shield removed, exposing a base plate and top plate of the present invention.
Figure 11:
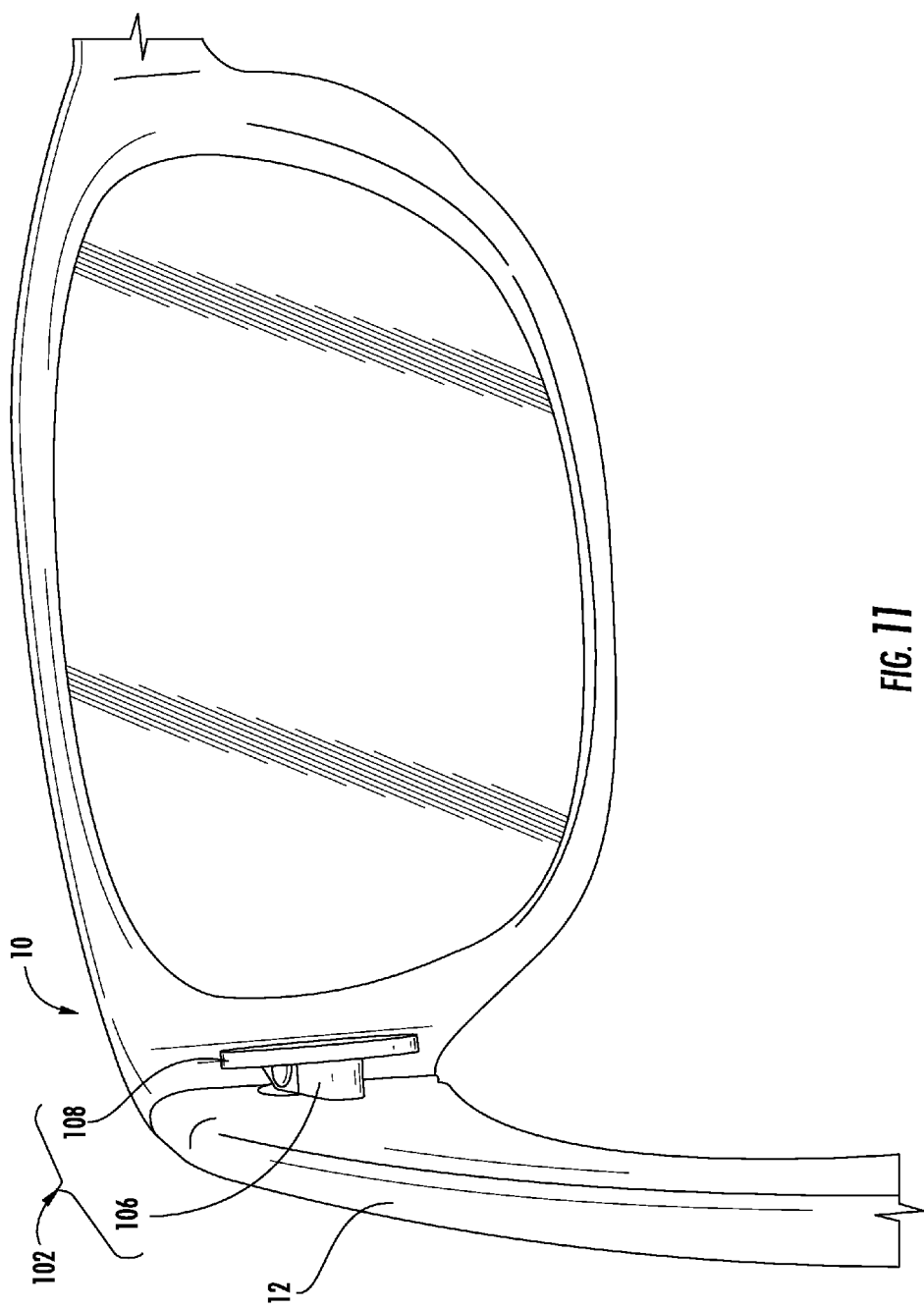
FIG. 11 shows a partial rear perspective view of an eyewear with the side shield removed, exposing a base plate and top plate of the present invention.

The side shield 112 includes its own locking member 114, or second locking member, that is complementary to the first locking member 102 on the inner surface of the temple 12. The configuration of the locking member 114 on the side shield 112 depends on the configuration of the locking member 102 on the inner surface of the temple 12. This interconnection allows for the side shield 112 to be removably affixed to the inner surface of the temple 12 and temporarily lock it in place. FIGS. 6-8 shows the interlocking arrangement of the locking member 102 on the temple 12 with the complementary locking member 114 on the side shield 112. The locking member 102 on the temple 12 is seen in FIGS. 9-11 where a base plate 106 secures the top plate 108 in place.

Figure 12:
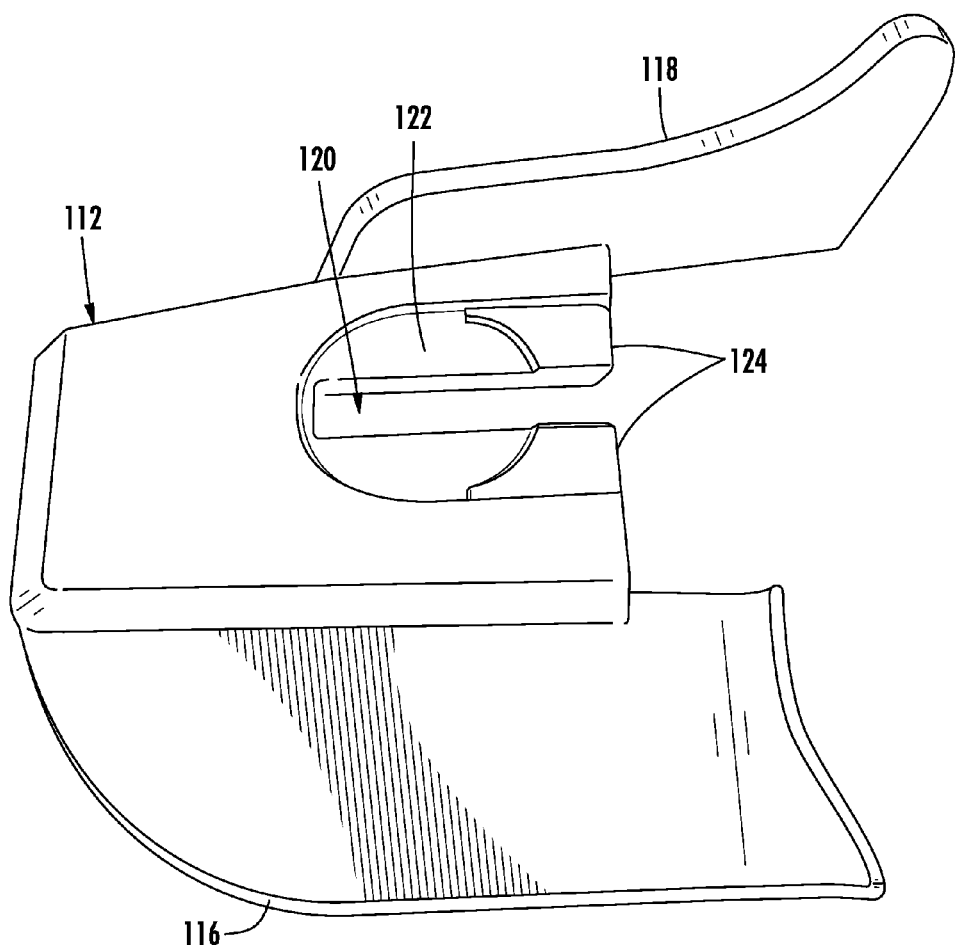
FIG. 12 shows an inner side of a preferred embodiment of the side shield in accordance with the present invention.
Figure 13:
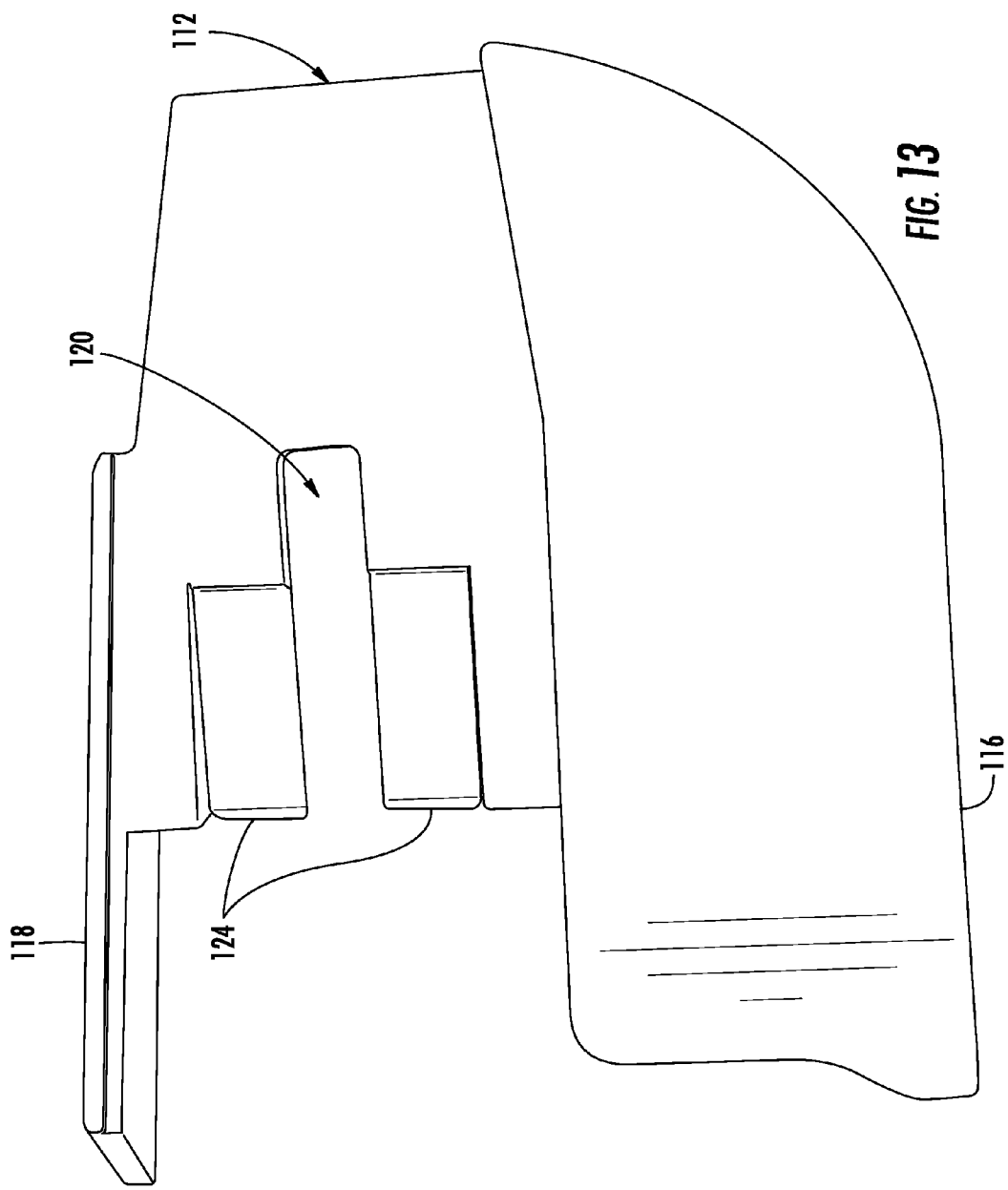
FIG. 13 shows an outer side of a preferred embodiment of the side shield in accordance with the present invention.
Figure 14:
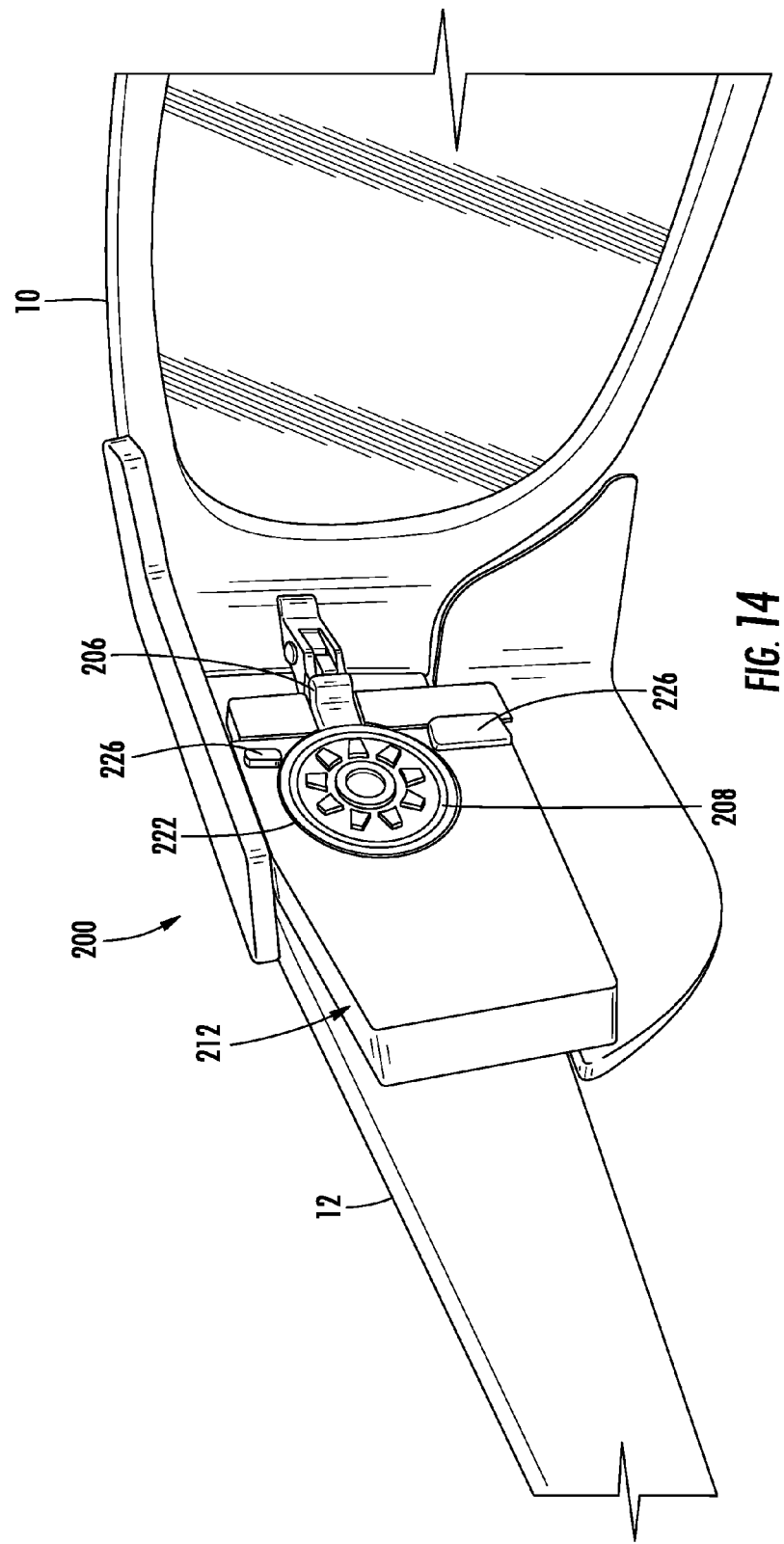
FIG. 14 shows a partial view on an inner surface of an eyewear with a further embodiment of the present invention installed onto an eyewear temple.
Figure 15:
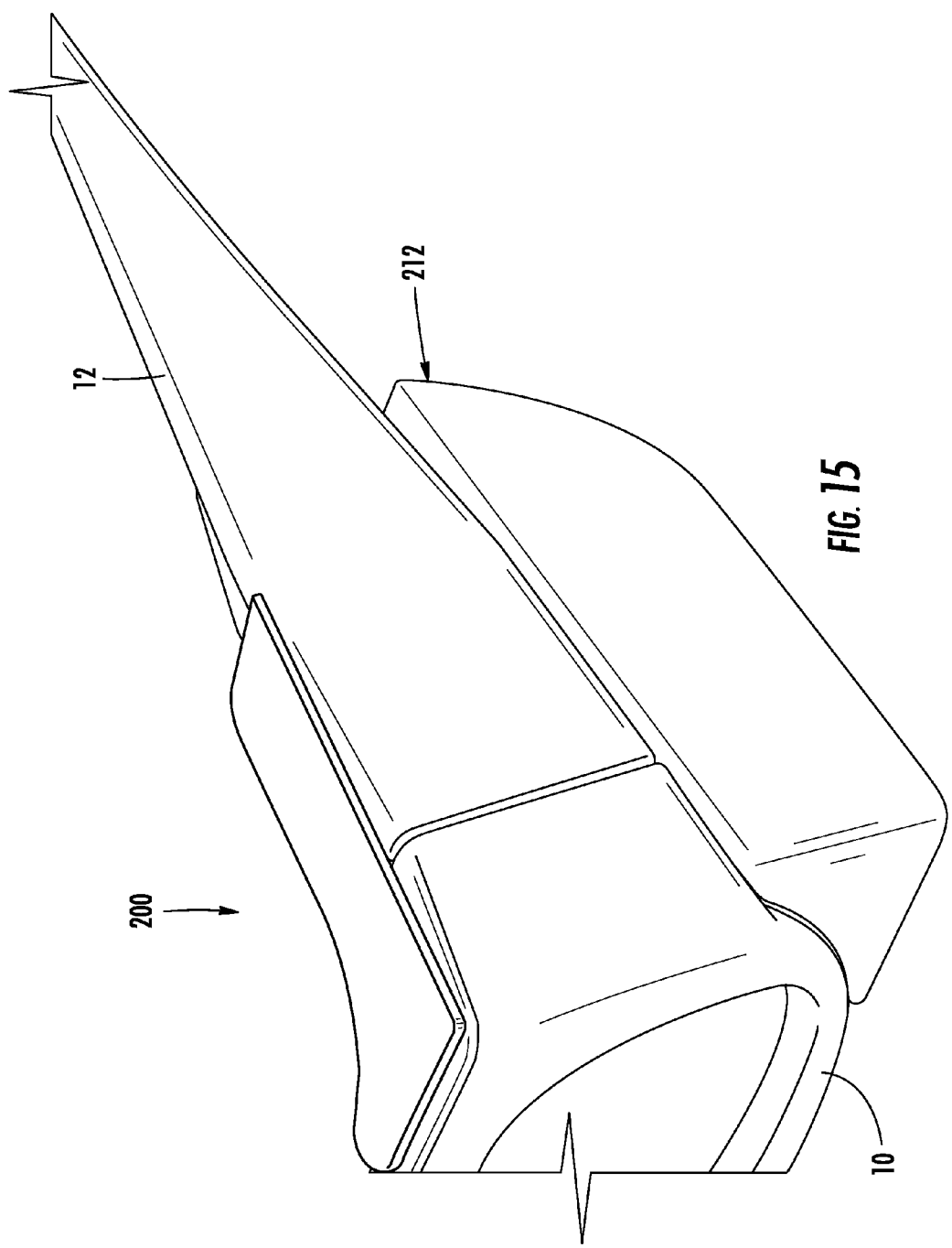
FIG. 15 shows a partial left side perspective view of a further embodiment of the side shield of the present invention installed onto an eyewear temple.
Figure 16:
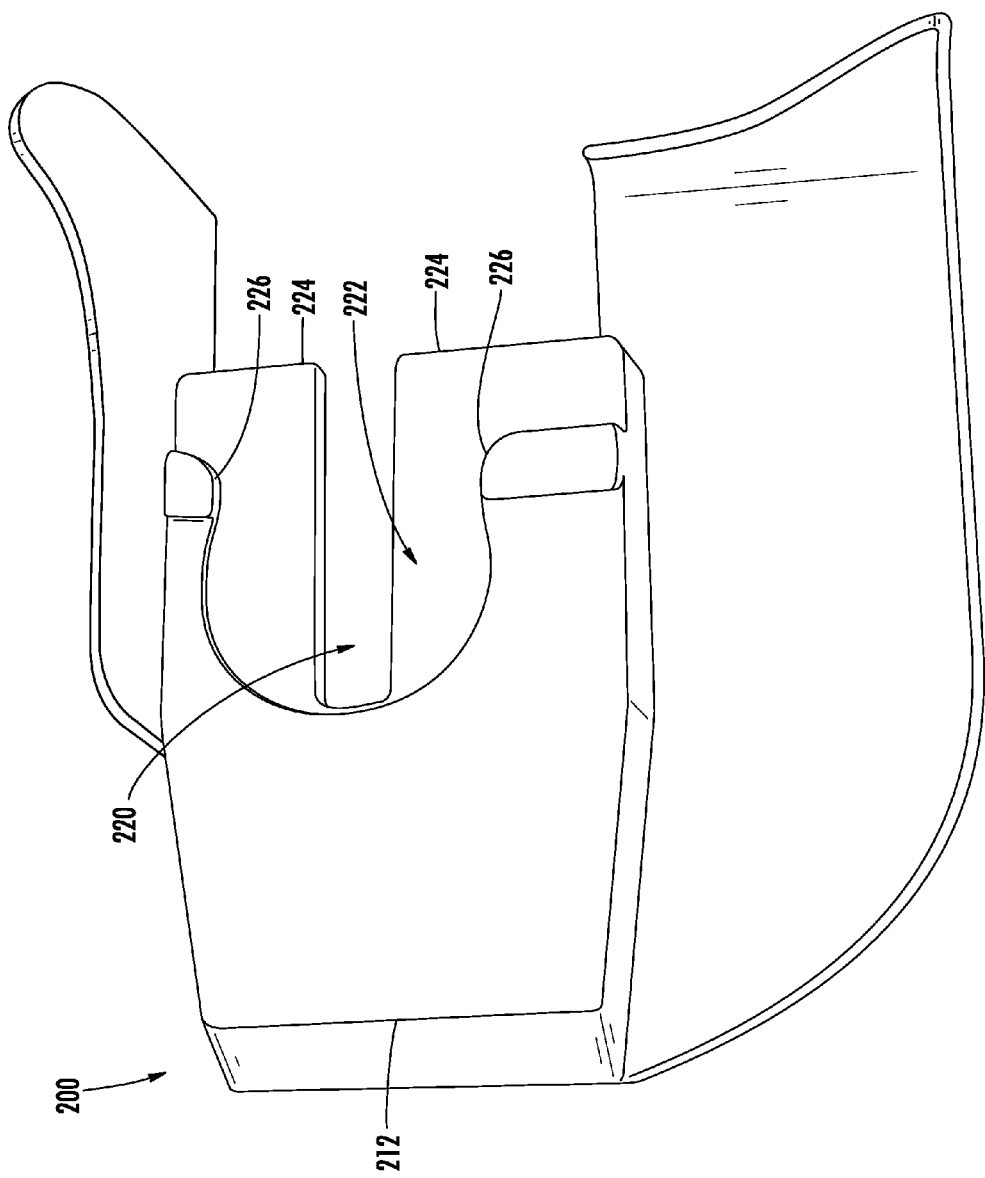
FIG. 16 shows an inner side of a further embodiment of the side shield in accordance with the present invention that employs a spreading configuration.
Figure 17:
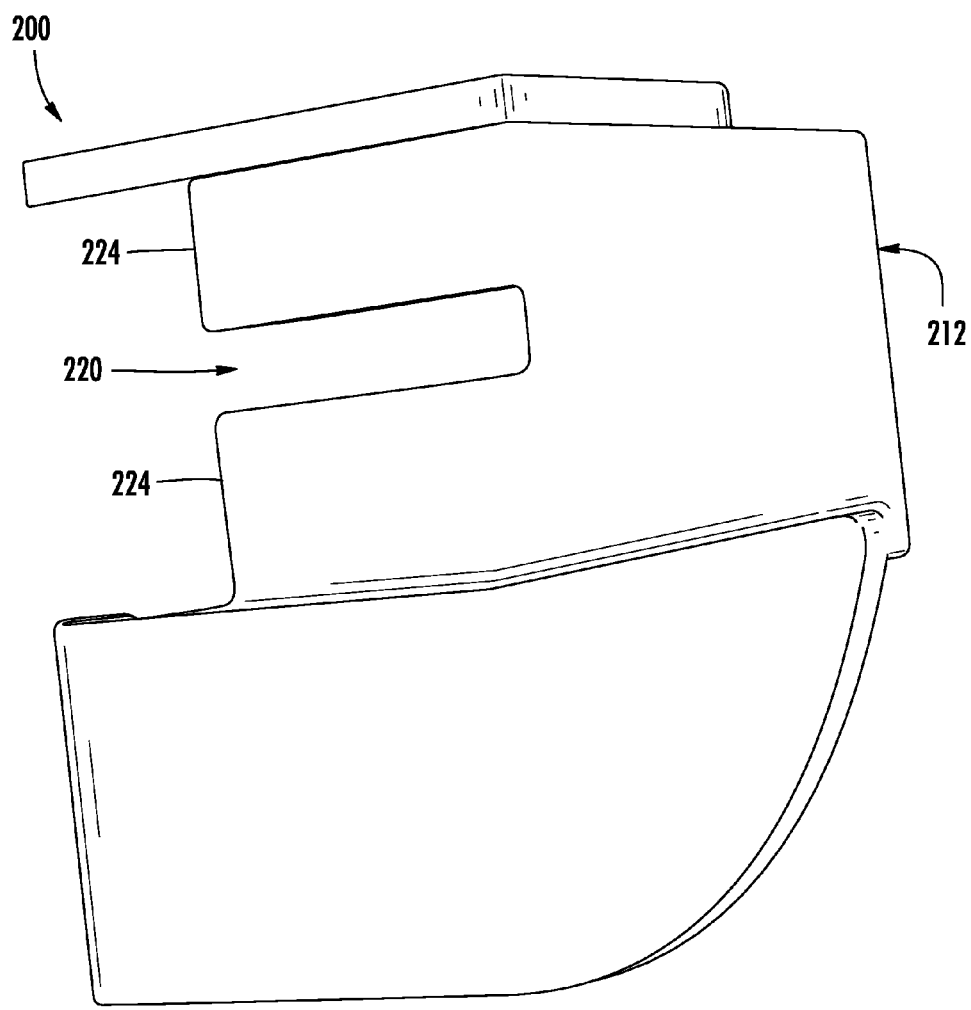
FIG. 17 shows an outer side of a further embodiment of the side shield of FIG. 16 in accordance with the present invention.

The side shield 112 structure can be seen in detail in FIGS. 12-13. The side shield 112 includes one or more guard members such as a lower guard member 116 and an upper guard member 118, that are configured to close off the space between a wearer's face and the eyewear 10, to prevent flying debris and liquids from injuring the wearer's eyes. The second locking member 114 includes a receiving groove 120 and locking seat 122 to receive the base plate 106 and top plate 108. The side shield 112 includes spring-biased flanges 124, described further below.

It should be understood that this configuration is just one example of what can be provided by the present invention. For example, the shape and configuration of the side shield can be modified to suit the eyewear at hand. Further, the side shield may be clear, tinted, painted or otherwise decorated. It may or may not meet required ANSI standards for protection from debris. For example, a tinted side shield need not be configured for protection from flying debris if it is solely for further side protection from sun or if it is for fashion only.

The interlocking of the side shield 112 on to the base plate 106 and secured by the top plate 108 can be seen in FIGS. 6-8. The base plate 106 slides into the receiving groove 120 on the side shield 112 so that the top plate 108 moves into communication with the locking seat 122 on the side shield 112. The top plate 108 rides over the spring-biased flanges 124 of the side shield 112 because the flanges 124 are deflected downwardly to permit the top plate 108 to clear over the flanges 124 to land in locking seat 122. Essentially, the side shield 112 will click into place. It can be removed by depressing on the flanges 124 so that the top plate 108 can clear out of the locking seat 122 so the side shield 112 can be slid out of communication with the base plate 106 and top plate 108.

To install the eyewear side shield assembly of the present invention, the side shield 112 is placed into communication with the inner surface of the temple 12 and then the locking member 102 on the temple 12 is engaged with the locking member 114 on the side shield 112. The side shield 112 is routed over the locking member 102 on the inner surface of the temple 12 so that the spring-biased flanges 122 forming the groove 120 of the side shield 112 engage with the post that spans between a base plate 106 and top plate 108 of the locking member 102 attached to the inner surface of the temple 12. When fully installed, the engagement of the two locking members 102, 114 secures the side shields 112 in place on the eyewear 10.

To remove the side shield 112, the interconnection of the two locking members 102, 114 must be manipulated by hand (with or without the assistance of a tool) to release the interconnection. When the interconnection of side shield 112 and temple 12 is released, the side shield 112 can be completely removed from the temple 12 thereby leaving the eyewear 10 free of a side shield 112, which is suitable for use outside the workplace, for example.

The locking configuration of FIGS. 1-13 is just one embodiment of the present invention. Any type of interconnection between the side shield 112 and the inner surface of the temple 12 is considered. For example, the locking member on the temple 12 includes a base plate 106 with a top plate 108 as in FIGS. 1-13. The top plate 108 may be of any configuration, such as a circle, oval, rectangle, square, H-shape, and the like. The locking member 102 on the temple 12 can be separate hardware, such as metal or plastic, or can be incorporated or integrally formed (such as insert molded) with the temple 12 itself and can be of any material, such as plastic and metal.

The base plate 106 of the locking member 102 on the inner surface of the temple 12 can be any configuration, such as a rectangle, spring hinge, threaded tube, and the like. This base plate 106 of the locking member 102 attached to the inner surface of the temple 12 can be attached to the temple 12 in many different ways, such as metal to metal (solder, weld, screw and the like); metal to metal core wire (solder, weld, screw and the like); plastic to plastic (plastic weld); any configuration using screws. Any of the configurations may be integrally formed with the temple 12 itself be it metal, plastic or otherwise.

Alternative embodiments, described further below, are possible for attaching the side shield to the eyewear. For the locking member on the side shield, it can be of any releasable configuration. For example, it can be a click-in or push-in systems on the side shield as in the form of relieved click tabs (previously shown in FIGS. 1-13), spreading click configuration (as will be described further below and shown in FIGS. 14-17 and 23A-23C), compression slide in configuration (as will be described further below and shown in FIGS. 18-22), and the like.

For example, the attached figures show some of the embodiments of the complementary locking structures that are envisioned. It should be understood that these are just examples and any other interconnection is considered within the scope of the present invention. It should also be noted that the portions of the side shields that extend beyond the temples to provide the protection could be of any configuration. As seen in the attached figures, typical shield shapes can be employed and location in any position, such as on the side and top of the eyewear.

As can be understood, the configuration may be modified to suit the application at hand. FIGS. 14-17 show different views of a further embodiment 200 of the side shield 212 where the shape and configuration of the side shield 212 has been modified. The base plate 206 slides into the receiving groove 220 on the side shield 212 so that the top plate 208 moves into communication with the locking seat 222 on the side shield 212. The spring-biased flanges 224 and shoulders 226 of the side shield 212 flex outwardly as the top plate 208 is pressed through them to sit in the locking seat 222. Essentially, the side shield 212 will click into place. It can be removed by pulling on the side shield 212 so that the top plate 208 forces the shoulders 226 outwardly and thereby can clear out of the locking seat 222 so the side shield 212 can be slid out of communication with the base plate 206 and top plate 208.

Figure 18:
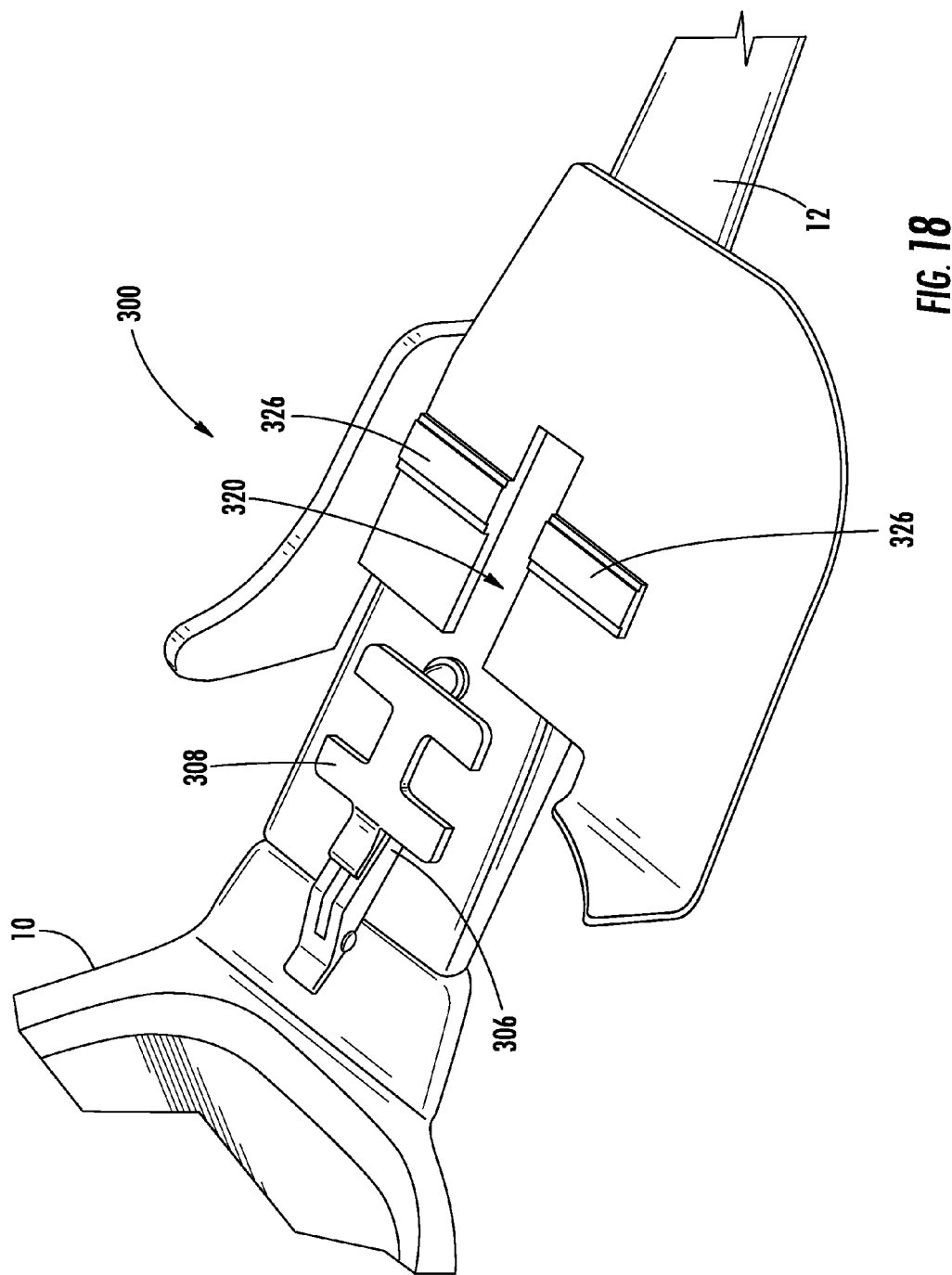
FIG. 18 shows a partial view of a right side inner surface of an eyewear with another embodiment of the present invention being installed onto the eyewear that employs a transverse ridge, where the complimentary locking members have not engaged.
Figure 19:
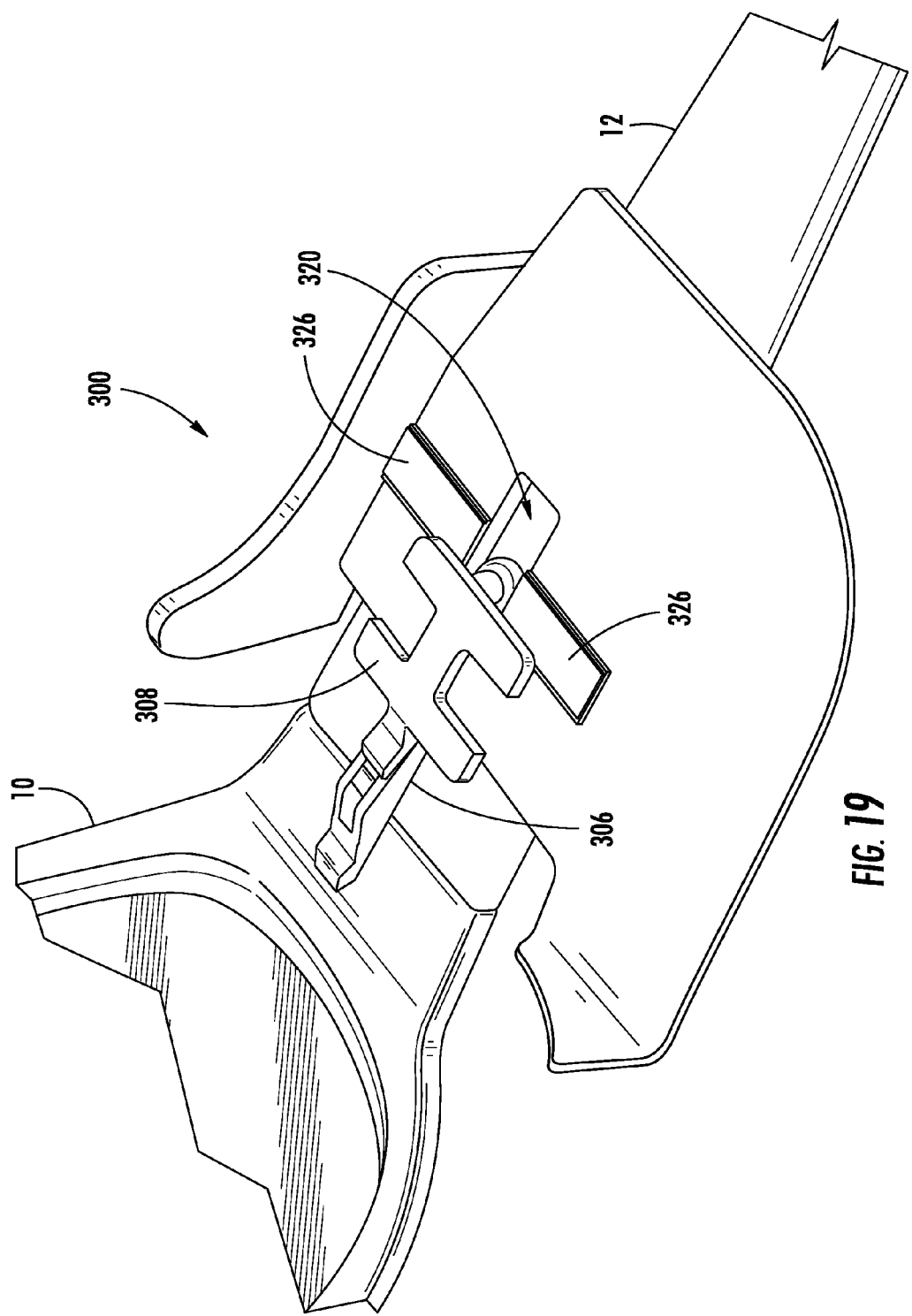
FIG. 19 shows a partial view of a right side inner surface of an eyewear with another embodiment of the present invention of FIG. 18 being installed onto the eyewear, where the complimentary locking members have partially engaged.
Figure 20:
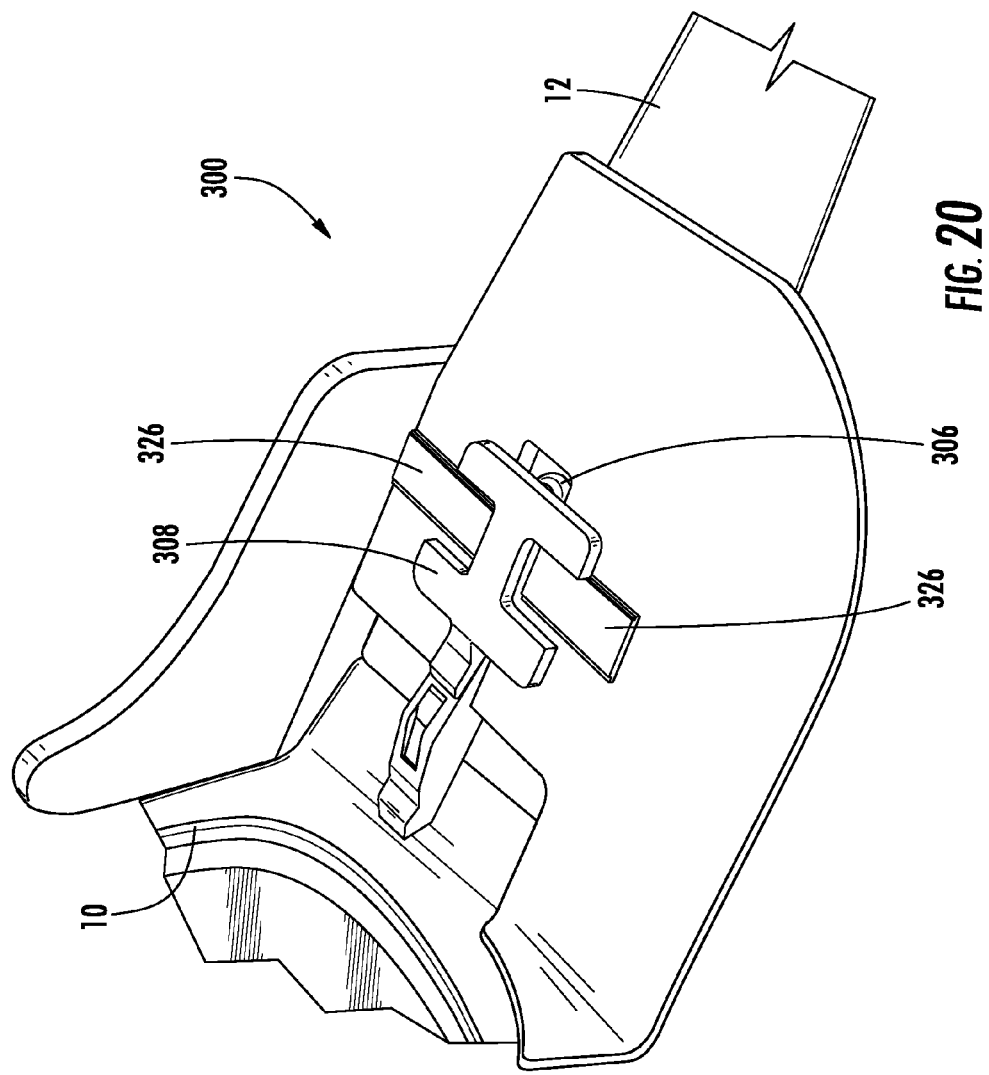
FIG. 20 shows a partial view of a right side inner surface of an eyewear with another embodiment of the present invention of FIG. 18 being installed onto the eyewear, where the complimentary locking members have fully engaged.

For example, FIGS. 18-20 show an embodiment 300 of a locking system that includes a top plate 308 in an H-shaped configuration that releasably receives a side shield 312 with a locking transverse ridge 326. The base plate 306 slides into the groove 320 for alignment while the locking ridge 326 snaps under the top plate 308 to provide the releasable connection.

Figure 21:
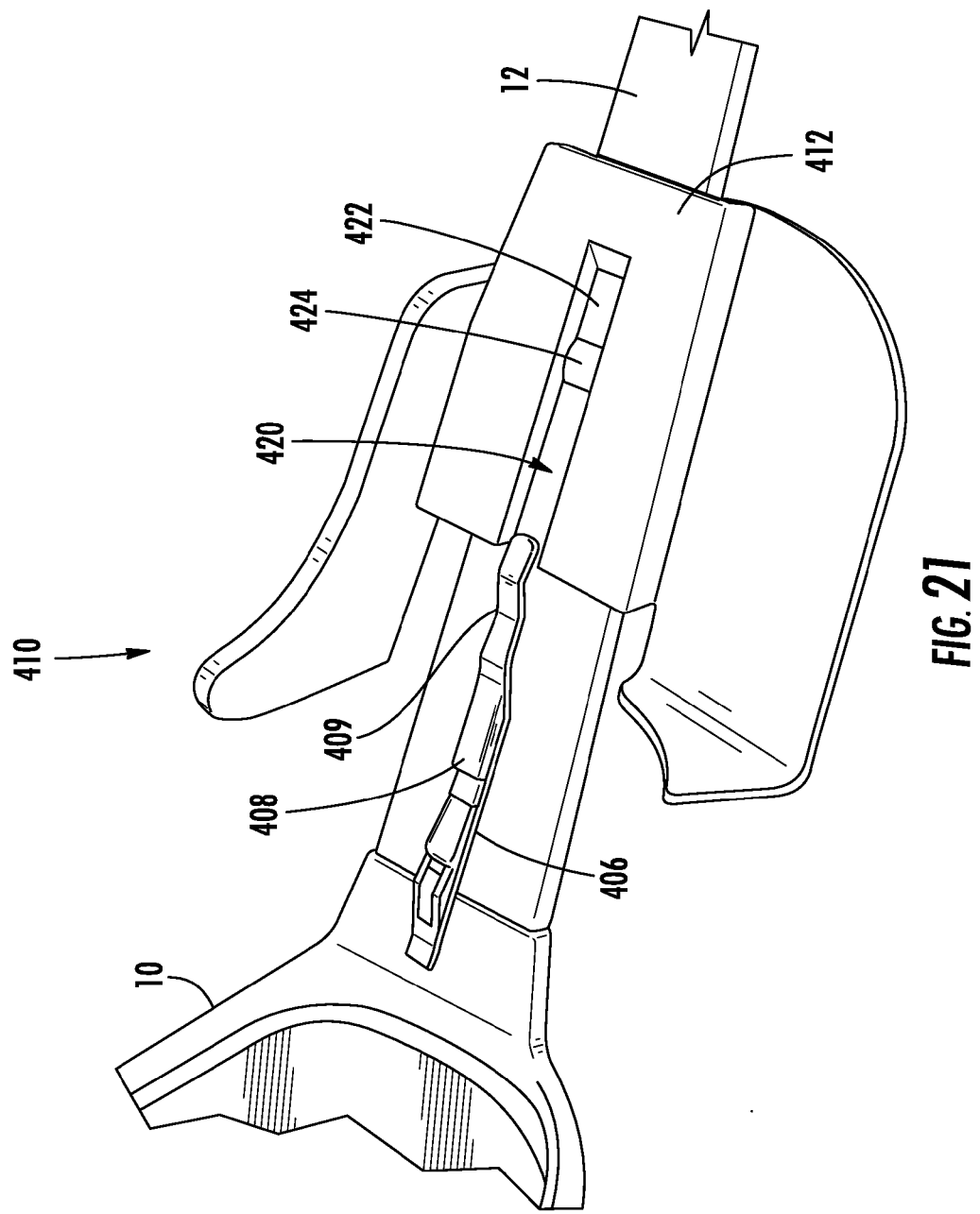
FIG. 21 shows a partial view of a right side inner surface of an eyewear with yet another embodiment of the present invention being installed onto the eyewear using a longitudinal clip configuration, where the complimentary locking members have not engaged.
Figure 22:
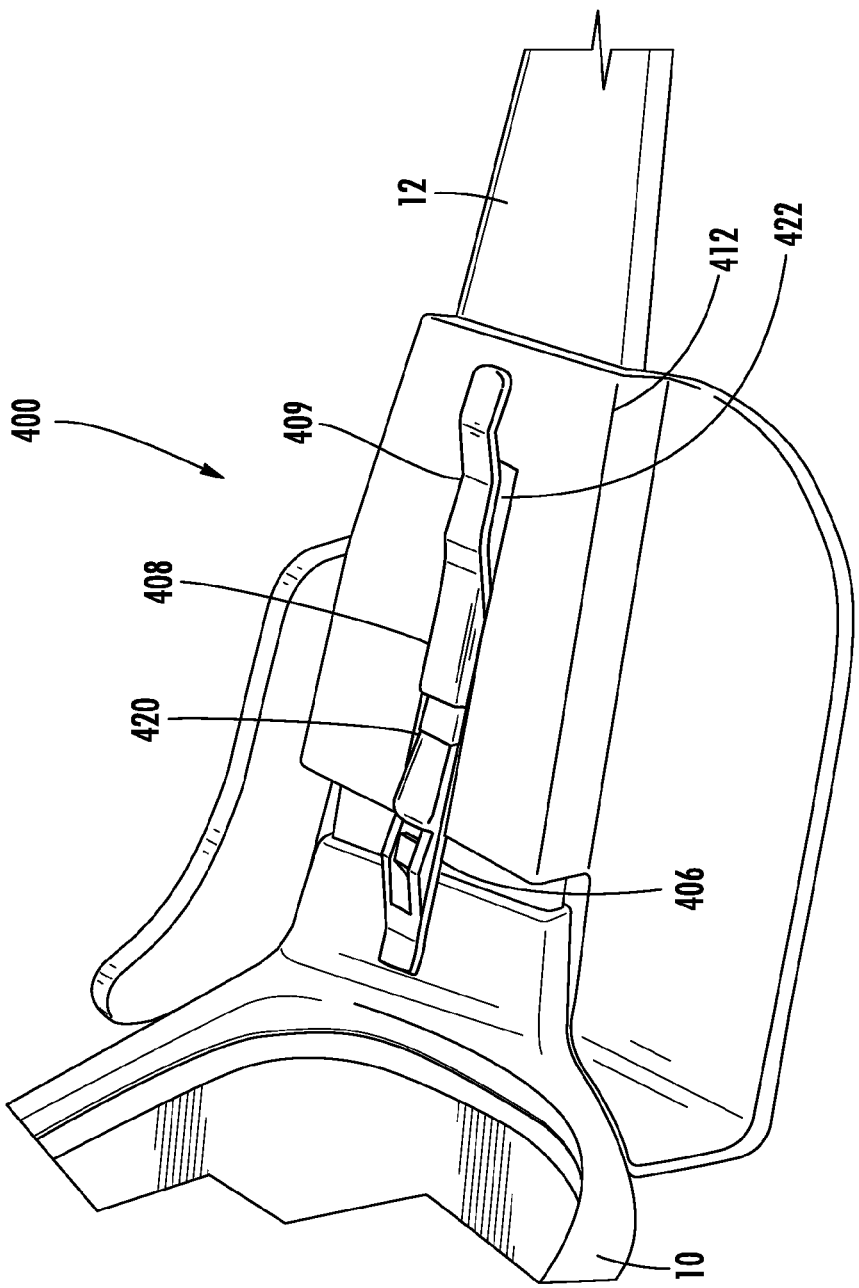
FIG. 22 shows a partial view of a right side inner surface of an eyewear with yet another embodiment of FIG. 21 of the present invention being installed onto the eyewear, where the complimentary locking members have fully engaged.

FIGS. 21 and 22 show yet another embodiment 400 of how the side shield 412 can be releasably secured to the temple's 12 inner surface. A spring-biased, longitudinally oriented clip 408 mounted to the base plate 406 has a detent 409 that releasably engages with a lock notch 422 formed by a ridge 424 within groove 420 on the side shield 412 while the base plate 406 is received in the groove 420. The side shield 412 can be released by simply pulling against the forces of the spring-biased clip 408 engagement of the detent 409 into the lock notch 422.

Figure 23A:
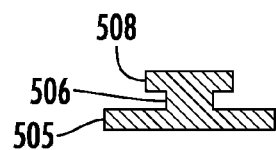
FIG. 23A shows a cross-section of a still another embodiment of the present invention that employs a base with double post configuration.
Figure 23B:
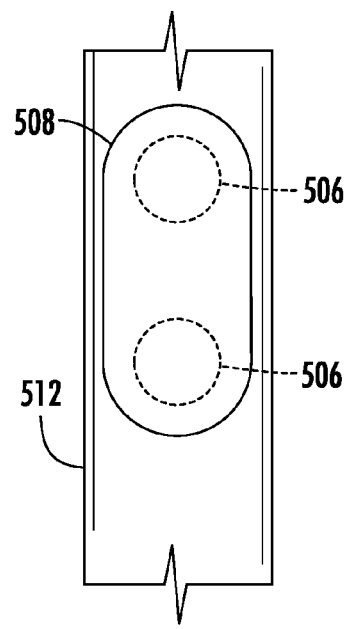
FIG. 23B shows a top view of the base of FIG. 23A.
Figure 23C:
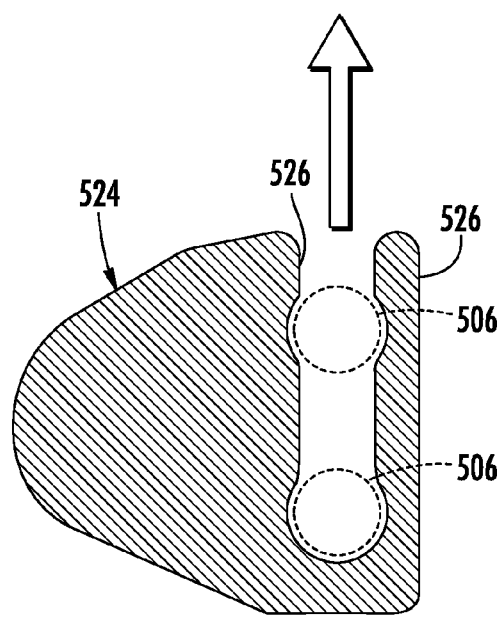
FIG. 23C shows a side shield being installed on the base of FIG. 23A.

Still further, FIGS. 23A, 23B and 23C show yet another embodiment 500 where base bushings or posts 506 are provided to receive a side shield with a laterally expanding spring-clip 524 expanding configuration. The expanding spring-clip 514 of the side shield of FIG. 23C is slide between the top plate 508 and the temple 12 so that the posts 506 are releasably captured by the arms 526 of the expanding spring-clip 524 of side shield. It is possible that the temple 12, base posts 506 and top plate 508 are integrally formed. Or, it is possible that the top plate 508, base posts 506 and a bottom plate 505 are integrally formed and then, in turn, secured to the inner surface of the temple 12.

It is also possible to make the interconnection of the side shield to the temple 12 "permanent". This can be accomplished in many ways by further modifying the assembly of the present invention. For example, a shim, screw, bushing can be attached and routed between or among the side shield and the temple and/or the locking members to prevent the side shield from being separated from the temple.

FIGS. 24-26 and 27A-D illustrate such a configuration for a substantially permanent attachment of the side shield to the temple of eyewear. Turning first to FIG. 24, an alternative embodiment 500 of the side shield 502 is shown to include spring-biased flanges 504. These flanges 504 are similar to the flanges 124 in the embodiment shown in FIG. 3, for example. As discussed above, the flanges 504 deflect outwardly so that the inner surface 506 thereof can releasably embrace a plate 108 or other member on the temple 12. Thus, to remove the shield 500 from the temple 12, the flanges 504 are depressed so the free ends 504a of the flanges 504 can clear past the plate 108.

The alternative embodiment 500 of FIGS. 24-26 and 27A-D provides a structure that prevents the flanges 504 from outwardly deflecting thereby making is very difficult if not impossible for the shield 502 to be removed from the temple 12. This is accomplished by providing transverse grooves or notches 508 on the spring-biased flanges 504, as can be seen in FIG. 24 and an installation tool 510 with a shield key 512 with a tooth 514 on each flange 504, as seen in FIG. 25, that is lodged between the outer surfaces of flanges 504 and the inner surface of the temple 12. The notches 508, for example, could be 0.60 mm in depth with a complementary teeth 514 of a similar size. In FIG. 26, such a shield key 512 is wedged into the void 516 between the spring-biased flanges 504 and the temple 12. A reverse teeth 514 are provided on the surface of the shield key 512 to permit installation into the void 516 while making removal very difficult if not impossible. With the shield key 512 in place, a spring-biased flanges 504 cannot flex outwardly to enable removal from the temple 12.

The installation of the wedge 512 requires locating it in the void 516 between the flanges 504 and the inner surface of the temple 12. Since it is small, it is provided as a detachable member connected to a handle 518, collectively referred to as an installation tool 510, which is shown in FIG. 25. The handle 518 is large enough in size that it can be easily gripped by a user with shield key 512 in place. The steps for installation thereof is shown in FIGS. 27A-D.

Figure 3:
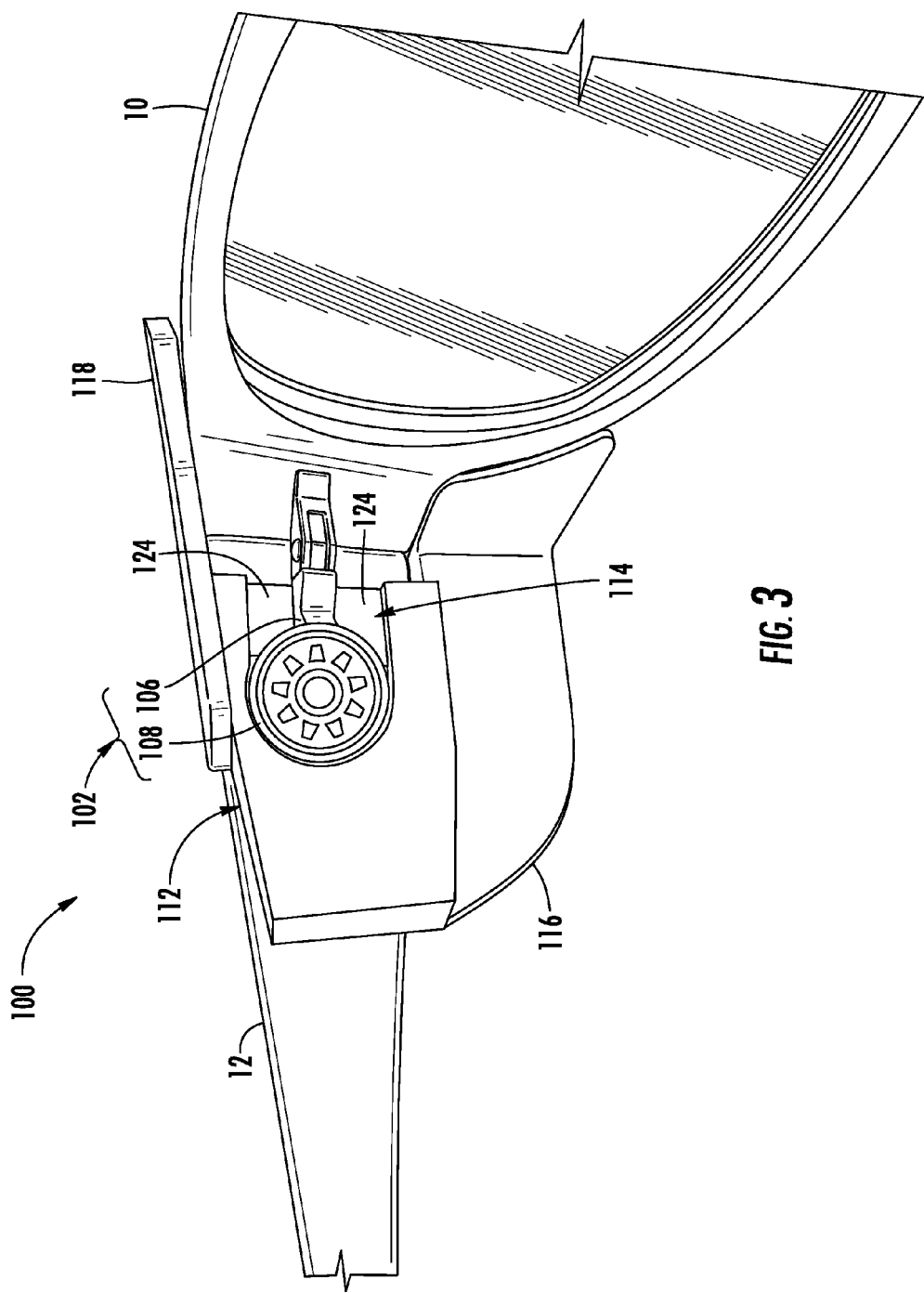
FIG. 3 shows a partial view on an inner surface of an eyewear with a preferred embodiment of the present invention installed onto the eyewear temple.
Figure 4:
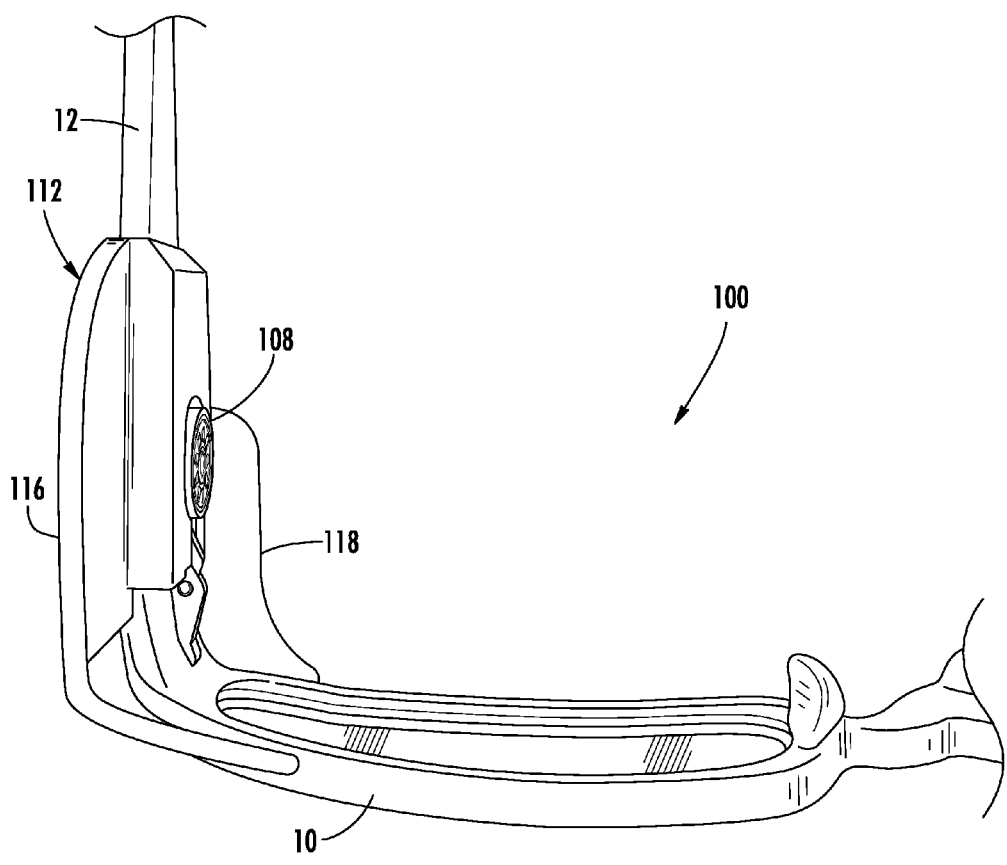
FIG. 4 shows a partial bottom view with a preferred embodiment of the present invention installed onto an eyewear temple.
Figure 5:
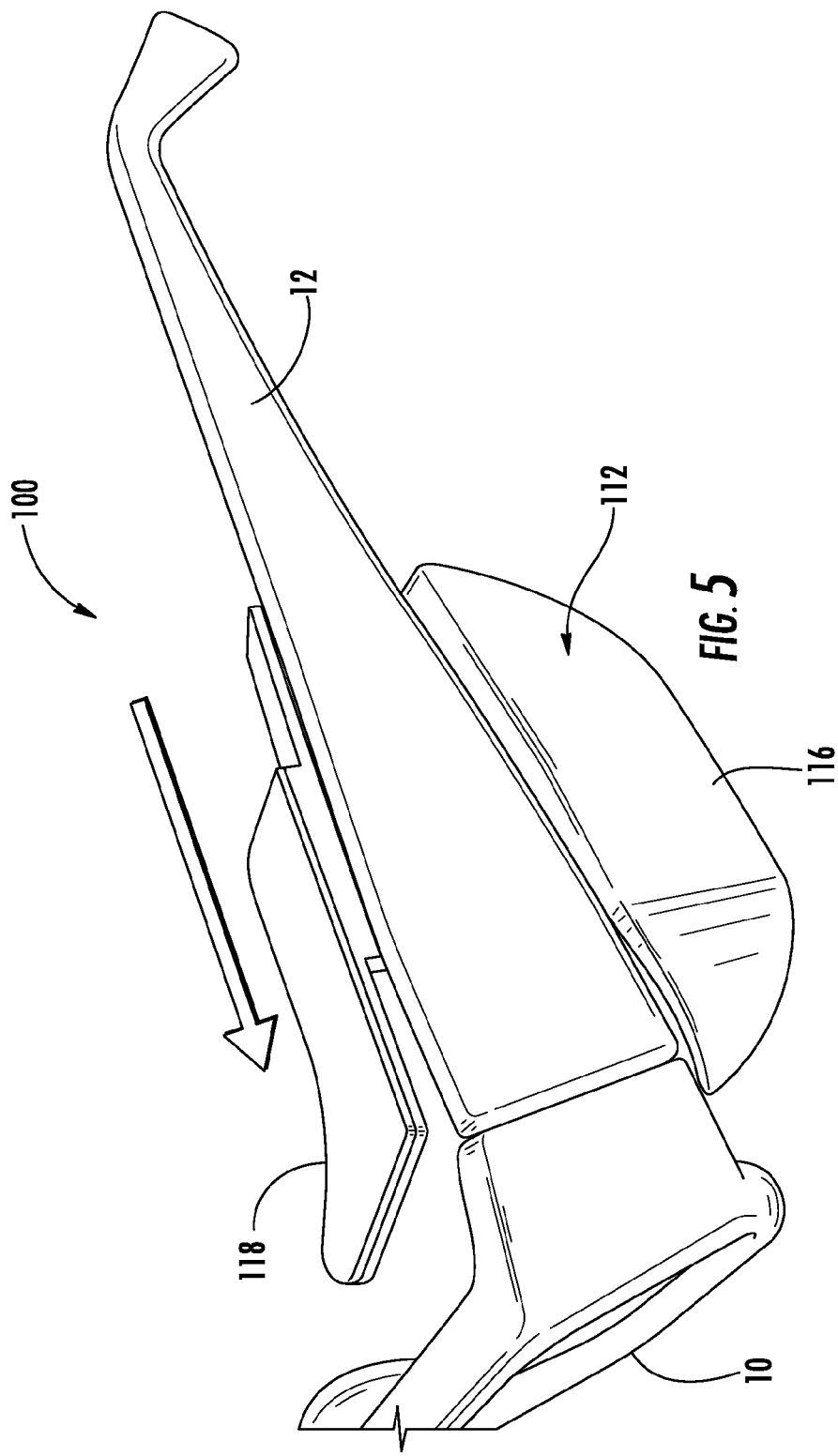
FIG. 5 shows a partial left side perspective view of with a preferred embodiment of the present invention in the process of being installed onto an eyewear temple.
Figure 27B:
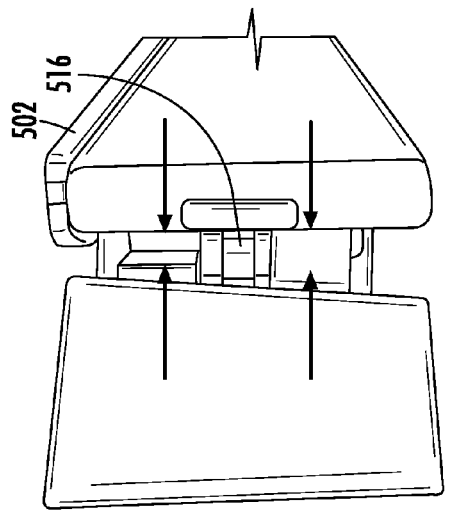
FIGS. 27A to 27D show the steps of installation of the side shield of FIG. 24 and wedge insert to provide a permanent attachment to eyewear.
Figure 27D:
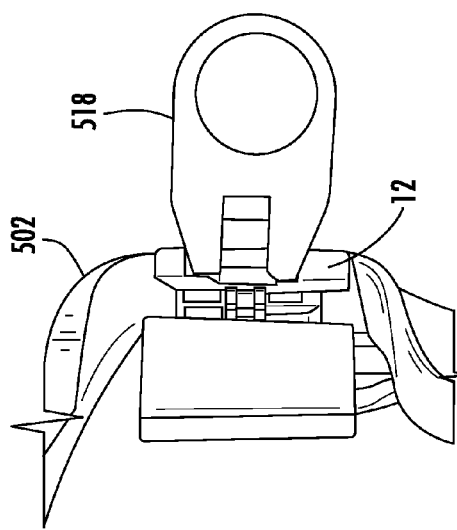
Figure 27A:
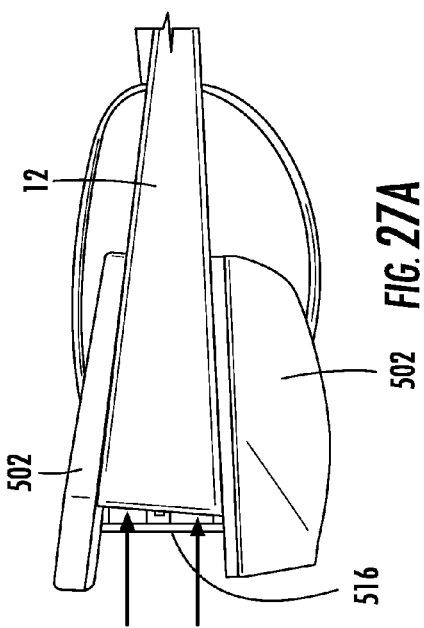
Figure 27C:
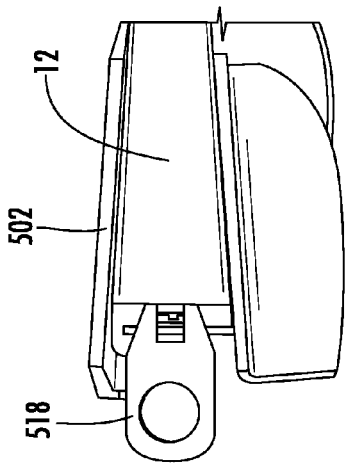

Referring now to FIG. 27A, the side shield 502 is installed on the temple 12, as in FIG. 3, for example and then the temple 12 is then hinged close to reveal an opening 516, as shown by the arrows. A close up of the opening 516 from the side is shown in FIG. 27B. The opening space 516 to receive the shield key 512 is shown by the arrows. In FIG. 27C, the handle 518 of tool 510 is gripped and the wedge key 512 on the end thereof is inserted into the opening 516 with the reverse cut teeth 514 facing inwardly toward the grooves 508 on the outer surface of the side shield 502. Inserting the shield wedge 512 fully into the opening 516 will cause it to snap into place when the teeth ride over into their respective grooves 508. At this point, it cannot be removed thereby being locked in place and taking up the space between the outer surface of the side shield 502 and the inner surface of the temple 12. In FIG. 27D, the handle 518 is broken off by rocking it back and forth to break off the shield key 512 at break off areas, as can be seen in FIG. 25, leaving the shield key 512 between the flanges 504 and the temple. The broken off handle 518 can then be discarded.

It should be understood that the configuration of the interconnection of the shield key 512 to the outer surface of the side shield 502 be modified in many different ways to secure it in place to prevent outward deflection of the flanges 508 to make the attachment of the side shield 502 substantially permanent. The teeth 514 and grooves 508 configuration can be modified, as needed. For example, the grooves 508 can be formed with a sloped draft angle (and the tooth with a complementary configuration) to provide improved locking or there may be only one groove and one tooth. Also, while the handle 518 and shield key 512 are preferably plastic, they can be made of any material.

Still further, it is possible to include one or more small tabs to the side shield, which overlaps the outside of the temple along the top and/or bottom, to provide additional strength for the side shield (not shown). These optional tabs provide more side impact support on narrower temples that employ narrower attachment systems.

It would be appreciated by those skilled in the art that various changes and modifications can be made to the illustrated embodiments without departing from the spirit of the present invention. All such modifications and changes are intended to be covered by the appended claims.

What is claimed is:

1. An eyewear assembly, comprising:
a temple having an outer side and an inner side;
a first locking member connected to the inner side of the temple; and
a side shield having a second locking member thereon; the first locking member and the second locking member being releasably connected to each other; the second locking member including a groove configured and arranged to slidably receive the first locking member;
the side shield being configured and arranged to be connected to the inner side of the temple with the outer side of the temple remaining unobstructed and undistorted by the side shield.

2. The eyewear assembly of claim 1, further comprising:
a permanent lock member permanently connecting the side shield to the temple.

3. The eyewear assembly of claim 1, wherein the first locking member comprises a hold down assembly.

4. The eyewear assembly of claim 3, wherein the hold down assembly comprises a base, a top plate and intermediate member residing therebetween.

5. The eyewear assembly of claim 4, wherein the top plate is selected from the group consisting essentially of: circle, oval, rectangle, square, and H-shape.

6. The eyewear assembly of claim 4, wherein the base is selected from the group consisting essentially of: rectangular plate, spring hinge, and threaded tube.

7. The eyewear assembly of claim 3, wherein the hold down assembly is integral to the temple.

8. The eyewear assembly of claim 1, wherein the first locking member comprises a spring-biased clip.

9. The eyewear assembly of claim 8, wherein the first locking member includes a detent.

10. The eyewear assembly of claim 1, wherein the second locking member includes a locking seat configured and arranged to connect to the first locking member.

11. The eyewear assembly of claim 1, wherein the second locking member includes a member configured and arranged to connect to the first locking member selected from the group consisting of a ridge and tabs.

12. The eyewear assembly of claim 1, wherein the second locking member includes a lock notch.

13. The eyewear assembly of claim 1, wherein the first locking member and the second locking member are configured and arranged in a configuration selected from the group consisting of a spreading click configuration and a compression slide configuration.

14. The eyewear assembly of claim 1, wherein the side shield includes a further member extending therefrom selected from the group consisting of an upper guard member extending therefrom and a lower guard member depending therefrom.

* * * * *